(12) United States Patent
Myhill et al.

(10) Patent No.: US 11,468,626 B2
(45) Date of Patent: *Oct. 11, 2022

(54) METHOD AND SYSTEM FOR AUTOMATED CAMERA COLLISION AND COMPOSITION PRESERVATION

(71) Applicant: Unity IPR ApS, Copenhagen (DK)

(72) Inventors: Adam Myhill, Mayne Island (CA); Gregory Labute, Outremont (CA)

(73) Assignee: Unity IPR ApS, Copenhagen (DK)

(*) Notice: Subject to any disclaimer, the term of this patent is extended or adjusted under 35 U.S.C. 154(b) by 0 days.

This patent is subject to a terminal disclaimer.

(21) Appl. No.: 16/940,352

(22) Filed: Jul. 27, 2020

(65) Prior Publication Data

US 2020/0357164 A1 Nov. 12, 2020

Related U.S. Application Data

(63) Continuation of application No. 15/923,893, filed on Mar. 16, 2018.

(60) Provisional application No. 62/551,134, filed on Aug. 28, 2017, provisional application No. 62/525,037, filed on Jun. 26, 2017, provisional application No. 62/473,107, filed on Mar. 17, 2017.

(51) Int. Cl.
*G06T 15/20* (2011.01)
*G06T 7/20* (2017.01)
*A63F 13/25* (2014.01)
*G06T 15/06* (2011.01)

(52) U.S. Cl.
CPC .............. *G06T 15/20* (2013.01); *A63F 13/25* (2014.09); *G06T 7/20* (2013.01); *G06T 15/06* (2013.01); *A63F 2300/65* (2013.01); *A63F 2300/6653* (2013.01); *A63F 2300/6661* (2013.01); *A63F 2300/6684* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 6,670,957 | B2 | 12/2003 | Fukuda |
| 7,612,777 | B2 | 11/2009 | Nagata et al. |
| 8,277,316 | B2 | 10/2012 | Haigh-hutchinson |

(Continued)

FOREIGN PATENT DOCUMENTS

| | | |
|---|---|---|
| BR | 1120190190600 A2 | 4/2020 |
| CN | 110431600 A | 11/2019 |

(Continued)

OTHER PUBLICATIONS

US 10,740,956 B2, 08/2020, Myhill et al. (withdrawn)

(Continued)

*Primary Examiner* — Jeffrey J Chow
(74) *Attorney, Agent, or Firm* — Schwegman Lundberg & Woessner, P.A.

(57) ABSTRACT

There is described herein systems and methods for camera colliders and shot composition preservation within a 3D virtual environment that prevent a virtual procedural camera from getting stuck behind an object, or penetrating into an object, when filming a subject, while at the same time also maintaining the screen composition of the subject in the camera shot.

20 Claims, 24 Drawing Sheets

(56) References Cited

U.S. PATENT DOCUMENTS

| | | | |
|---|---|---|---|
| 8,712,103 | B2 | 4/2014 | Focke et al. |
| 9,327,191 | B2 | 5/2016 | Miyamoto et al. |
| 10,148,876 | B1* | 12/2018 | Ribeiro .............. H04N 21/2187 |
| 10,688,392 | B1* | 6/2020 | Hardiman ........... A63F 13/5252 |
| 2002/0051057 | A1* | 5/2002 | Yata ........................ G06T 7/246 |
| | | | 348/142 |
| 2002/0159637 | A1* | 10/2002 | Echigo ...................... G06T 7/20 |
| | | | 707/E17.121 |
| 2003/0107647 | A1 | 6/2003 | James |
| 2003/0162592 | A1 | 8/2003 | Takahashi |
| 2004/0063501 | A1* | 4/2004 | Shimokawa .......... A63F 13/577 |
| | | | 463/49 |
| 2004/0224757 | A1 | 11/2004 | Yamamura et al. |
| 2005/0270309 | A1* | 12/2005 | Murata ................. A63F 13/525 |
| | | | 345/632 |
| 2008/0070684 | A1 | 3/2008 | Hutchinson |
| 2009/0163274 | A1 | 6/2009 | Kando |
| 2010/0095249 | A1 | 4/2010 | Yoshikawa et al. |
| 2012/0262447 | A1* | 10/2012 | Takizawa .............. G06T 15/503 |
| | | | 345/419 |
| 2012/0293693 | A1* | 11/2012 | Sumitomo ........... H04N 13/271 |
| | | | 348/246 |
| 2014/0031103 | A1 | 1/2014 | Amano et al. |
| 2014/0354687 | A1* | 12/2014 | Kiuchi .................... A63F 13/10 |
| | | | 345/633 |
| 2015/0287158 | A1 | 10/2015 | Cerny et al. |
| 2016/0078305 | A1 | 3/2016 | Higgins-luthman |
| 2017/0232343 | A1* | 8/2017 | Yoshioka .............. A63F 13/525 |
| | | | 463/31 |
| 2018/0017659 | A1* | 1/2018 | Irie .................... H04N 5/23206 |
| 2018/0121736 | A1* | 5/2018 | Tsunashima ....... H04N 5/23218 |
| 2018/0276874 | A1 | 9/2018 | Myhill et al. |

FOREIGN PATENT DOCUMENTS

| | | |
|---|---|---|
| EP | 1428562 A2 | 6/2004 |
| JP | H0785312 | 3/1995 |
| JP | 2002163676 | 6/2002 |
| JP | 2004187806 | 7/2004 |
| JP | 2004329463 | 11/2004 |
| JP | 2009059111 | 3/2009 |
| JP | 2011215886 | 10/2011 |
| JP | 2012104021 | 5/2012 |
| JP | 2012511999 | 5/2012 |
| JP | 2014235596 | 12/2014 |
| JP | 2020514920 A | 5/2020 |
| RU | 2463663 C2 | 10/2012 |
| RU | 2540849 C2 | 2/2015 |
| WO | WO-2009113547 A1 | 9/2009 |
| WO | WO-2018167319 A1 | 9/2018 |

OTHER PUBLICATIONS

US 10,776,990 B1, 09/2020, Myhill et al. (withdrawn)
"European Application Serial No. 18712556.2, Communication Pursuant to Article 94(3) EPC dated Aug. 3, 2020", 6 pgs.
"U.S. Appl. No. 15/923,893, Corrected Notice of Allowability dated Aug. 14, 2020", 2 pgs.
"Brazilian Application Serial No. BR1120190190600, Office Action dated Aug. 18, 2020", w/o English Translation, 5 pgs.
"U.S. Appl. No. 15/923,893, Corrected Notice of Allowability dated Sep. 10, 2020", 2 pgs.
"Japanese Application Serial No. 2019-551265, Office Action dated Nov. 10, 2020", w/ English Translation, 15 pgs.
"U.S. Appl. No. 15/923,893, Non Final Office Action dated Nov. 17, 2020", 13 pgs.
"European Application Serial No. 18712556.2, Response filed Dec. 3, 2020 to Communication Pursuant to Article 94(3) EPC dated Aug. 3, 2020", 23 pgs.
"U.S. Appl. No. 15/923,893, Final Office Action dated Apr. 1, 2021", 14 pgs.
"Japanese Application Serial No. 2019-551265, Response filed May 10, 2021 to Office Action dated Nov. 10, 2020", w/ English claims, 21 pgs.
"European Application Serial No. 18712556.2, Communication Pursuant to Article 94(3) EPC dated Feb. 25, 2021", 8 pgs.
Ben-Ari, Moti, "ATutorial on Euler Angles and Quaternions", [Online], Retrieved from the Internet: <URL: https://www.weizmann.ac.il/sci-tea/benari/sites/sci-tea.benari/files/uploads/softwareAndLearningMaterials/quaterniontutorial-2-0-1.pdf>, (Dec. 31, 2014), 22 pgs.
U.S. Appl. No. 15/923,893, Response filed Feb. 19, 2021 to Non Final Office Action dated Nov. 17, 2020, 13 pgs.
Canadian Application Serial No. 3,056,269, Response filed Jan. 8, 2021 to Office Action dated Jul. 10, 2020, 12 pgs.
Japanese Application Serial No. 2019-551265, Office Action dated Jul. 13, 2021, w/ English Translation, 3 pgs.
Russian Application Serial No. 2019132825, Response filed Dec. 30, 2020 to Office Action dated Feb. 26, 2020, w/ English Claims, 22 pgs.
U.S. Appl. No. 15/923,893, Corrected Notice of Allowability dated Jun. 10, 2020, 2 pgs.
U.S. Appl. No. 15/923,893, Corrected Notice of Allowability dated Jul. 2, 2020, 2 pgs.
U.S. Appl. No. 15/923,893, Non Final Office Action dated Aug. 22, 2019, 12 pgs.
U.S. Appl. No. 15/923,893, Notice of Allowance dated Apr. 1, 2020, 5 pgs.
U.S. Appl. No. 15/923,893, Response Filed Feb. 21, 2020 to Non Final Office Action dated Aug. 22, 2019, 13 pgs.
Brazilian Application Serial No. BR1120190190600, Voluntary Amendment filed Jun. 22, 2020, w/o English Claims, 34 pgs.
Canadian Application Serial No. 3,056,269, Office Action dated Jul. 10, 2020, 4 pgs.
Canadian Application Serial No. 3,056,269, Voluntary Amendment filed May 21, 2020, 10 pgs.
European Application Serial No. 18712556.2, Response to Communication pursuant to Rules 161(2) and 162 EPC filed May 6, 2020, 17 pgs.
International Application Serial No. PCT/EP2018/056768, International Preliminary Report on Patentability dated May 29, 2019, 8 pgs.
International Application Serial No. PCT/EP2018/056768, International Search Report dated May 24, 2018, 5 pgs.
International Application Serial No. PCT/EP2018/056768, Response filed Apr. 12, 2019 to Written Opinion dated Feb. 14, 2019, 23 pgs.
International Application Serial No. PCT/EP2018/056768, Written Opinion dated Feb. 14, 2019, 9 pgs.
International Application Serial No. PCT/EP2018/056768, Written Opinion dated May 24, 2018, 7 pgs.
Japanese Application Serial No. 2019-551265, Voluntary Amendment filed Jun. 10, 2020, w/ English Claims, 14 pgs.
Russian Application Serial No. 2019132825, Office Action dated Feb. 26, 2020, w/ English Translation, 12 pgs.
U.S. Appl. No. 15/923,893, filed Mar. 16, 2018, Method and System for Automated Camera Collision and Composition Preservation.

* cited by examiner

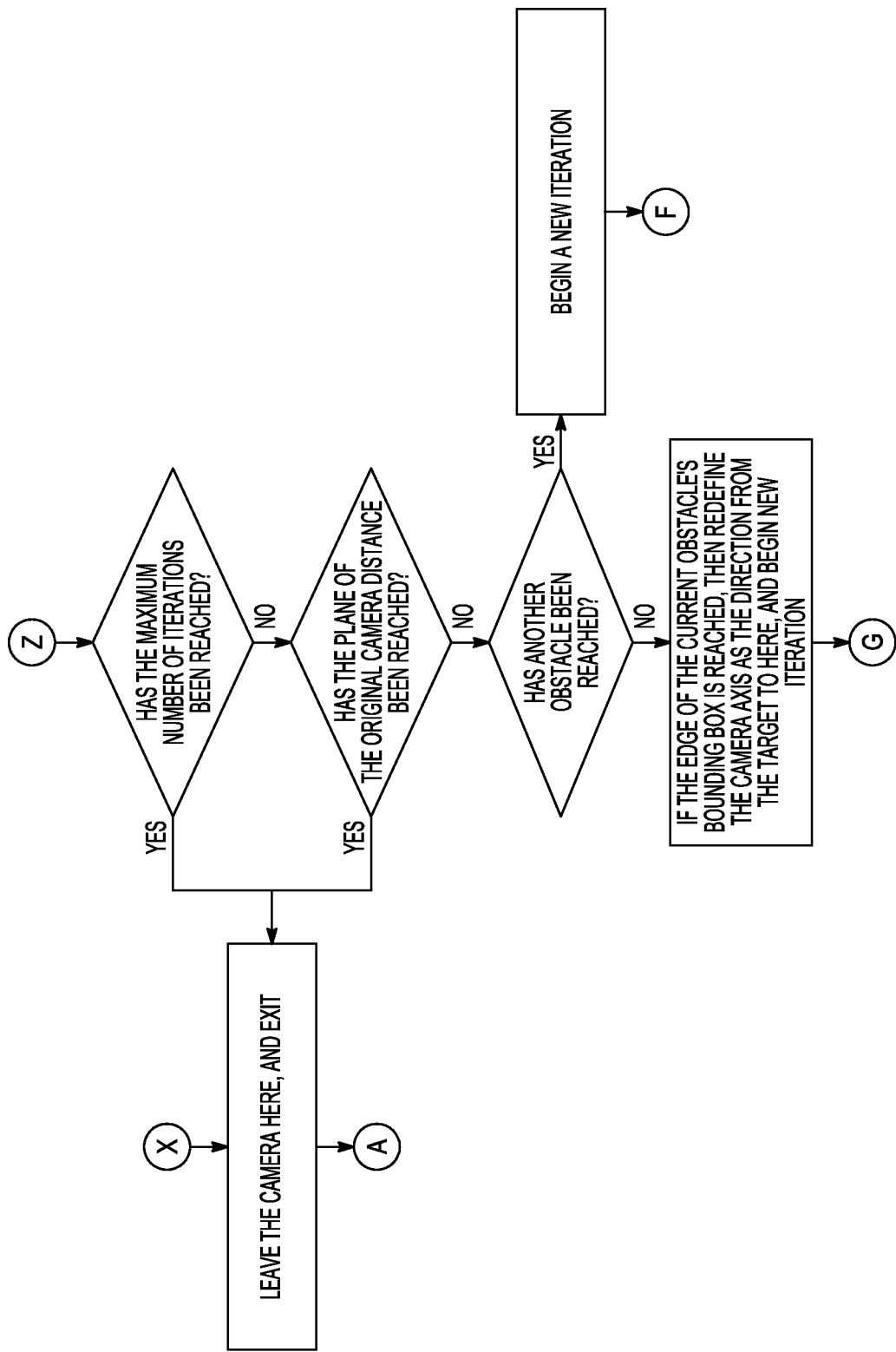

Cinemachine State Driven Camera (Script) ☑

| | |
|---|---|
| Status: Live | Solo |
| Priority | 10 |
| Look At | None (Transform) |
| Follow | None (Transform) |
| Show Debug Text | ☑ |
| Enable All Child Cameras | ☐ |
| Animated Target | Mouse (Animator) |
| Layer | Base |
| Default Blend | Ease In Out    0.5 SEC |

CUSTOM BLENDS    CM StateDrivenCamera1 Blends (CinemachineBle)

| FROM | TO | STYLE | TIME |
|---|---|---|---|
| CM FreeLook1 | CM FreeLook1 Sneak | Ease In Out | 1 |
| CM FreeLook1 Sneak | CM FreeLook1 | Ease In Out | 1 |
| CM FreeLook1 | CM pov | Cut | |
| CM pov | ANY CAMERA | Cut | |

| STATE | CAMERA | WAIT | MIN |
|---|---|---|---|
| Locomotion.Run Default | CM FreeLook1 | 0 | 0 |
| Locomotion.Run Sneak | CM FreeLook1 Sneak | 0 | 0 |

| VIRTUAL CAMERA CHILDREN | PRIORITY |
|---|---|
| CM FreeLook1 (CinemachineFreeLook) | 11 |
| CM FreeLook1 Sneak (CinemachineFreeLook) | 11 |
| CM pov (CinemachineVirtualCamera) | 10 |

| STATE | CAMERA | WAIT | MIN |
|---|---|---|---|
| = Locomotion.Run Default | CM FreeLook1 | 0 | 0 |
| = Locomotion.Run Sneak | (none) | 0 | 0 |
| | ☑ CM FreeLook1 | | + − |
| | CM FreeLook1 sneak | | |

| VIRTUAL CAMERA CHILDREN | | PRIORITY |
|---|---|---|
| = CM FreeLook1 (CinemachineFreeLook) | ⊙ | 11 |
| = CM FreeLook1 Sneak (CinemachineFreeLook) | ⊙ | 11 |

FIG. 8C

| CUSTOM BLENDS | | CM StateDrivenCamera1 Blends (CinemachineBle) ⊙ | |
|---|---|---|---|
| FROM | TO | STYLE | TIME |
| = CM FreeLook1 | CM FreeLook1 Sneak | Ease In Out | 1 |
| = CM FreeLook1 Sneak | CM FreeLook1 | Ease In Out | 1 |
| = CM FreeLook1 | CM pov | Cut | |
| = CM pov | ANY CAMERA | Cut | |
| | | | + − |

FIG. 8D

| VIRTUAL CAMERA CHILDREN | | | PRIORITY |
|---|---|---|---|
| = CM FreeLook1 (CinemachineFreeLook) | ⇕ | ⊙ | 11 |
| = CM FreeLook1 Sneak (CinemachineFreeLook) | ⇕ | ⊙ | 11 |
| = CM pov (CinemachineVirtualCamera) | ⇕ | ⊙ | 10 |
| | | | + − |

FIG. 8E

☑ Cinemachine State Driven Camera (Script)

| | |
|---|---|
| Status: Live | Solo |
| Priority | 10 |
| Look At | None (Transform) ⊙ |
| Follow | None (Transform) ⊙ |
| Show Debug Text | ☑ |
| Enable All Child Cameras | ☐ |
| Animated Target | Mouse (Animator) ⊙ |
| Layer | Base ⇕ |
| Default Blend | Ease In Out ⇕  0.5  SEC |

FIG. 8F

METHOD AND SYSTEM FOR AUTOMATED CAMERA COLLISION AND COMPOSITION PRESERVATION

CROSS-REFERENCE TO RELATED APPLICATIONS

This application is a continuation of and claims the benefit of priority under 35 U.S.C. § 120 to U.S. patent application Ser. No. 15/923,893, filed on Mar. 16, 2018, which claims the benefit of U.S. Provisional Application No. 62/473,107, filed Mar. 17, 2018, U.S. Provisional Application No. 62/525,037, filed Jun. 26, 2017, and U.S. Provisional Application No. 62/551,134, filed Aug. 28, 2017, each of which is incorporated by reference herein in its entirety.

TECHNICAL FIELD

The present disclosure relates to the field of software tools for automated cinematography.

BACKGROUND

In the world of 3D virtual cinematography, there exists procedural cameras for shooting scenes with variable scenarios. The procedural cameras are programmed to adapt in some ways to the scene and the objects therein. For example, in order to shoot a scene, the procedural camera can follow a subject through a 3D environment while maintaining a distance and fixed orientation with respect to the subject. However, with procedural cameras shooting variable scenarios (e.g. subject in motion, other 3D objects in motion, etc.), there are many cases where the subject will be occluded from the camera view by some intermediate object or move out of the desired shot composition. In some instances, the camera following the subject can get stuck behind an object while trying to follow the subject, or it might penetrate into the object in order to maintain a certain shot with respect to the subject.

One example of procedural camera use where the above problems can become significant is in recording and broadcasting video games; wherein a non-playing host watches and broadcasts their view, along with commentary, of a real-time online multiplayer video game. These non-playing users are referred to as "hosts" and their broadcast is a hosting of the game. Many third parties can tune in and watch the hosted games via websites such as Twitch® and YouTube®. The hosts use procedural cameras to record the video game and the difficulties of the procedural cameras described above lead to poor cinematographic quality (e.g. shot composition, camera cuts, and more) and a poor user experience for the video game audience.

BRIEF DESCRIPTION OF THE DRAWINGS

Further features and advantages of the present disclosure will become apparent from the following detailed description, taken in combination with the appended drawings, in which:

FIGS. 6D-1 and 6D-2 are a flowchart showing a collider method, in accordance with one embodiment;

FIGS. 6F-1 and 6F-2 are a flowchart showing a collider method, in accordance with one embodiment;

FIG. 8A is a screenshot illustrating a user interface panel for a state driven camera;

FIG. 8B is a screenshot illustrating a dynamically populated drop-down list of states in a game;

FIG. 8C is a screenshot illustrating the result of clicking on the camera button;

FIG. 8D is a screenshot illustrating how state driven cameras may be blended together;

FIG. 8E is a screenshot illustrating a user defined list of all the cameras which are to be exposed to the state driven camera with controls for the priority;

FIG. 8F is a screenshot illustrating controls for overall priority of a single state driven camera system;

It will be noted that throughout the appended drawings, like features are identified by like reference numerals.

DETAILED DESCRIPTION

The following description and drawings are illustrative of the disclosure and are not to be construed as limiting the disclosure. Numerous specific details are described to provide a thorough understanding of the present disclosure. However, in certain instances, details well known to those in the art are not described in order to avoid obscuring the description of the present disclosure.

There is described herein systems and methods for camera colliders and shot composition preservation within a 3D virtual environment that prevent a virtual procedural camera from getting stuck behind an object, or penetrating into an object, when filming a subject, while at the same time also maintaining the screen composition of the subject in the camera shot.

Terminology: Throughout the description herein the term 'subject' refers to an object within the 3D virtual environment which is the desired main subject matter of a virtual camera during filming (e.g., the subject is often the focus of the camera).

Figure 1:
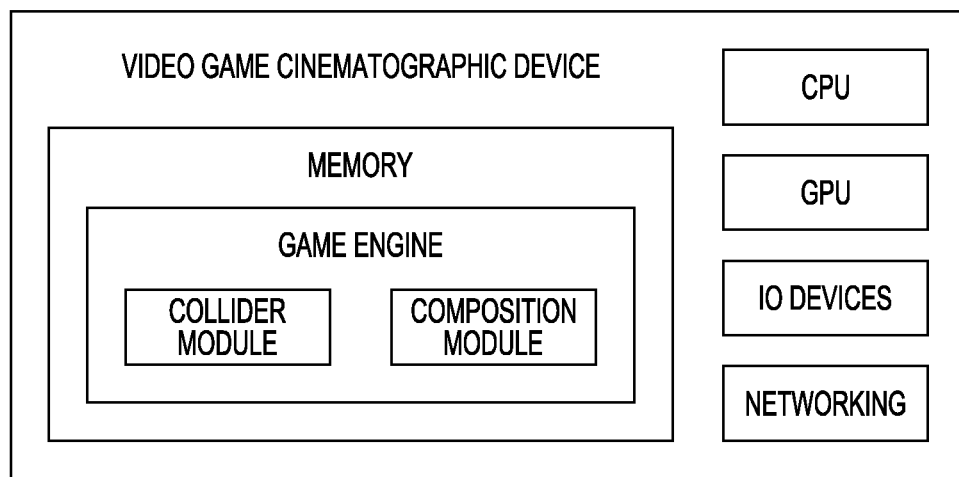
FIG. 1 is a schematic illustrating a video game cinematography system including a collider module and a composition module, in accordance with one embodiment.

Turning now to the drawings, systems and methods for camera collision and composition preservation in accordance with embodiments of the disclosure are illustrated. FIG. 1 is a component diagram of a video game cinematography device that includes a game engine device and associated peripherals. In the example embodiment, the video game cinematography device is a computing device operated by a user. The user may be a player of an online multi-player game (e.g., an eSports game), or a broadcasting host (or just "host") that provides various broadcast functions associated with the video game. The video game cinematography device includes one or more display devices (e.g., conventional computer monitors, VR wearable devices, and so forth) and one or more input devices (e.g., keyboard, mouse, handheld pointing device, touchscreen, and the like). The video game cinematography device also includes a memory, one or more central processing units (CPUs), one or more graphics processing units (GPUs), and one or more network adapters (e.g., wired or wireless network adapters providing network connectivity used for the video game).

In the example embodiment, the video game cinematography device includes a gaming engine (e.g., executed by the CPU or GPU) that presents the video game (or simulation) to the user. The gaming engine includes a collider module and a composition module that provide cinematographic functionality as described herein. Each of the composition module and collider module, as well as the gaming engine include computer-executable instructions residing in the memory that are executed by the CPU or the GPU during operation. The gaming engine communicates with the display devices and also with other hardware such as the input device(s). The composition module and the collider module may be integrated directly within the gaming engine, or may be implemented as an external piece of software (e.g., a plugin or other independent video processing software).

In accordance with an embodiment, the composition module changes the orientation of a virtual camera to keep a specific part of the subject (referred to herein as the subject target, or simply target) within a particular area on the camera screen (referred to herein as the target zone). The method described herein is a highly performant, accurate method for maintaining a target's position in screen space. The composition module includes time-based tracking speeds as well as bounding boxes within the camera screen to define how quickly it will orient the camera to position the target within the desired target zone. The composition module described herein controls the orientation of the camera, but does not need to control the camera distance to the subject and therefore can be used with other systems that control the camera position (either in absolute 3D space or position with respect to a subject).

Figure 2A:
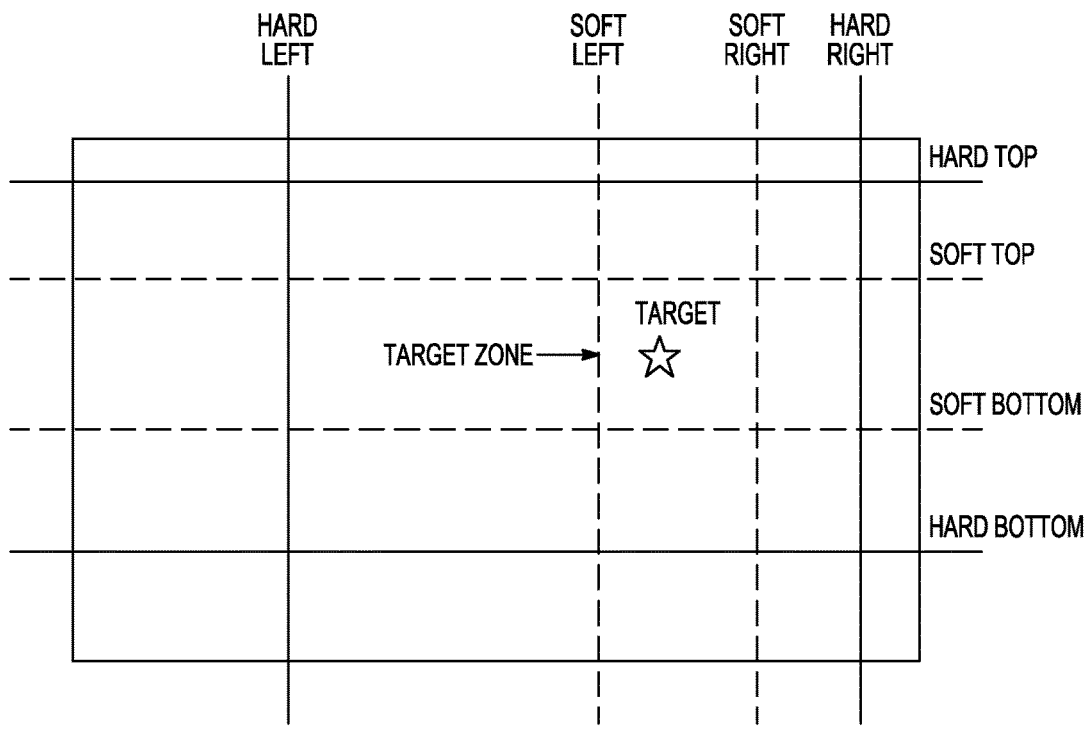
FIG. 2A is a schematic illustrating a screenshot showing a composition target zone and its surrounding boundary zones, in accordance with one embodiment.
Figure 2B:
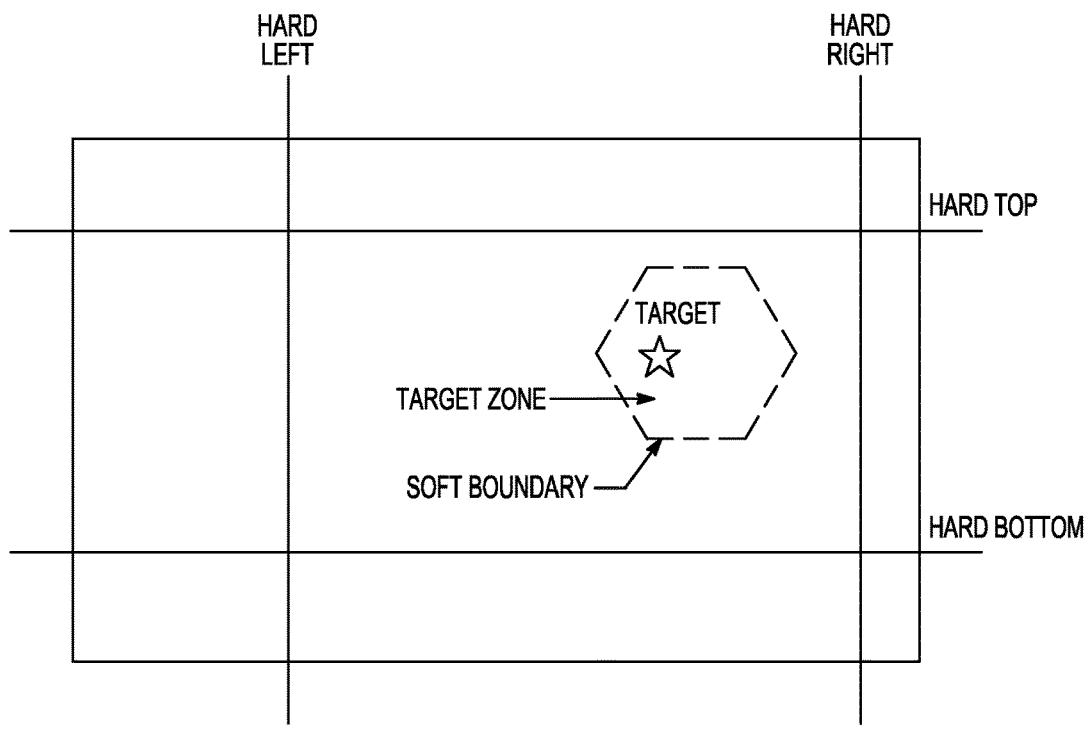
FIG. 2B is a schematic illustrating a screenshot showing a composition target zone and its surrounding boundary zones, in accordance with one embodiment.

In accordance with many embodiments and shown in FIG. 2A and FIG. 2B, is a camera screen containing boundaries for the shot composition module. The composition of the subject is defined by placing the subject within a specific area of the 2-dimensional space of the camera screen. The specific area is referred to as the target zone. During the filming of a shot, the composition module dynamically changes the orientation of the camera to keep the target inside the target zone. As seen in the figure, the target zone on the camera screen is defined by several sets of boundaries. When visualized it appears as three regions of the screen: a target zone which lies within all the soft boundaries, a soft boundary zone which occupies the space between the soft boundaries and the hard boundaries, and a hard boundary zone which occupies the space outside of the hard boundary zones. The boundaries (and thus the target zone) are defined by a user or could be chosen by an automated procedure using cinematography rules.

In some embodiments, the subject may be a composite subject that includes multiple targets, each of which may move independently. For example, the composite subject may include two or more players on a team, or a player and a fixed location or other non-player object. The composition module may use the camera to track the composite subject, positioning and orienting the camera based on location and orientation aspects of the composite subject or its targets (e.g., as a center of mass-type calculation). The composite subject may be used as a logical group, and may be used as a "LookAt", allowing use of the composite subject as a target for other users to view. In some embodiments, the composite subject's position may be set to be the center of a bounding box that includes all of the composite subject's targets (e.g., computed from the positions and radii of the targets of the composite subject).

In some embodiments, each target within the composite subject may be given a relative weight which may influence the position and orientation of the camera relative to the composite subject. For example, the camera may be skewed toward a team captain or a team member leading a group by weighting the lead team member higher than another, for example causing the camera to shift center of focus more toward the higher-weighted team member. In some embodiments, the weights of each target of the composite subject may change dynamically based on actions taken by the particular targets. For example, if one team member is shooting at an enemy while a second team member is idle and looking a different direction, the active team member may be weighted higher. In some embodiments, the average orientation is the normalized weighted sum of the quaternions representing the orientations of the targets. As such, and for example, the contemporaneous actions of the targets may cause the camera to shift center of focus more toward the active team member and the orientation of the camera toward the orientation of the active team member (e.g., more toward the direction of fire of the active player).

In some embodiments, the composition module may dynamically auto-frame the composite subject based on their positions. For example, if objects move apart, the composition module may adjust the field of view or camera position such as to include all of the targets within the composite subject. In some embodiments, the composition module may create a bounding box for the composite subject based on an initial camera position and evaluate the screen space it occupies. In some embodiments, the dimensions of the screen space may be specified by a viewing user of the composite subject (e.g., in both horizontal and vertical camera dimensions). The camera may adjust its field of view to reframe the composite subject as the individual targets move. In some embodiments, the reframing may be accomplished by moving the camera toward or away from the composite subject (e.g., along the camera-target center axis). In some embodiments, damping may be applied to the reframing action such that the camera repositioning takes place over a period of time, thereby avoiding jagged transitions.

Figure 3:
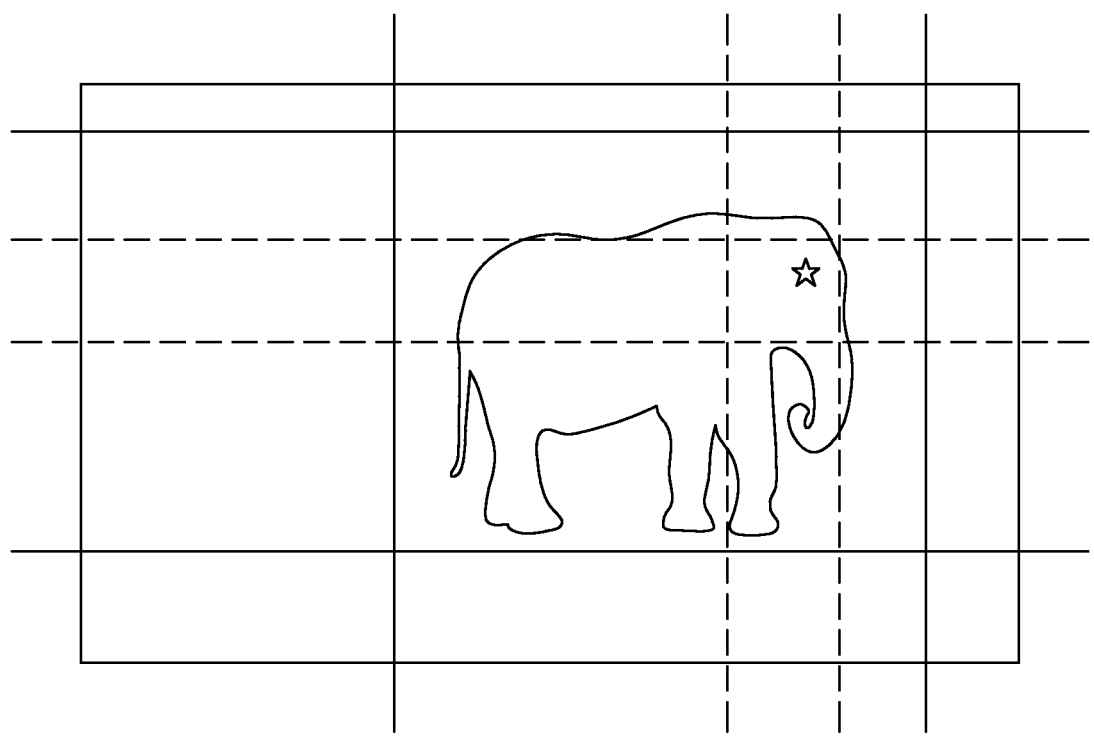
FIG. 3 is a schematic showing subjection composition, in accordance with one embodiment.

FIG. 3 shows an example of subject composition with the target zone boundaries wherein the subject is an elephant and the subject target is the elephant's right eye. The target zone in the example is an area on the upper right part of the camera screen.

In accordance with an embodiment, the behavior of the composition module when the target is in each of these 3 zones is characterized as:

Target zone—If the target is within the target zone, then no camera orientation takes place and the composition module continues to monitor the target position on the camera screen.

Soft boundary zone—If the target is determined to be between a soft boundary and a hard boundary, then the composition module orients the camera at the desired horizontal and vertical tracking speeds to move it into the target zone. The tracking speeds are defined in screen space.

Hard boundary zone—the target is not allowed to be beyond any of the hard boundary lines. A target beyond one of the hard boundary lines will cause the composition module to immediately orient the camera to the edge of the hard boundary nearest to the target. There is no time delay (e.g. time constant is zero) for this action, the camera is moved immediately upon the detection of its position beyond the boundary.

Figure 6A:
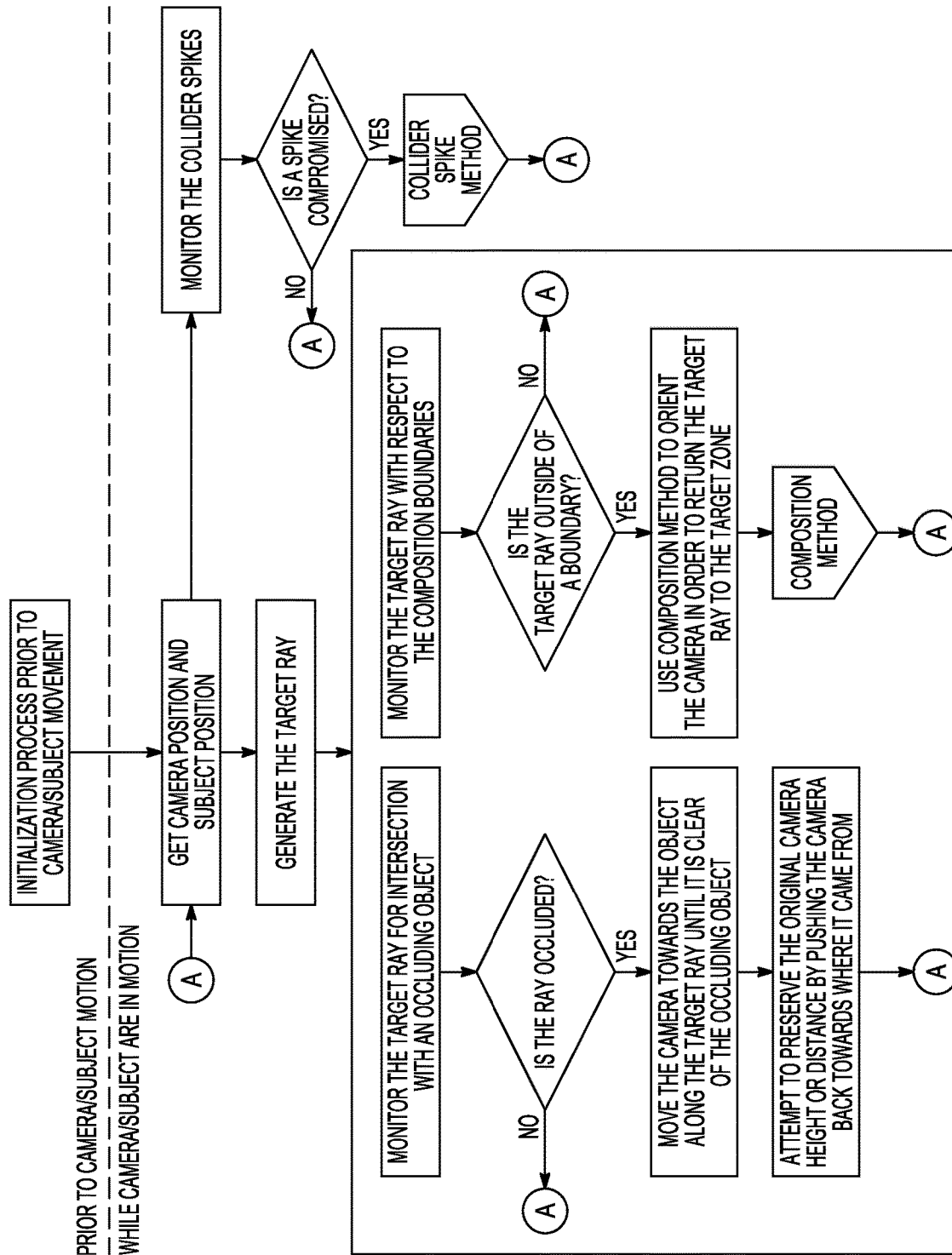
FIG. 6A is a flowchart showing a collider method, in accordance with one embodiment.
Figure 6B:
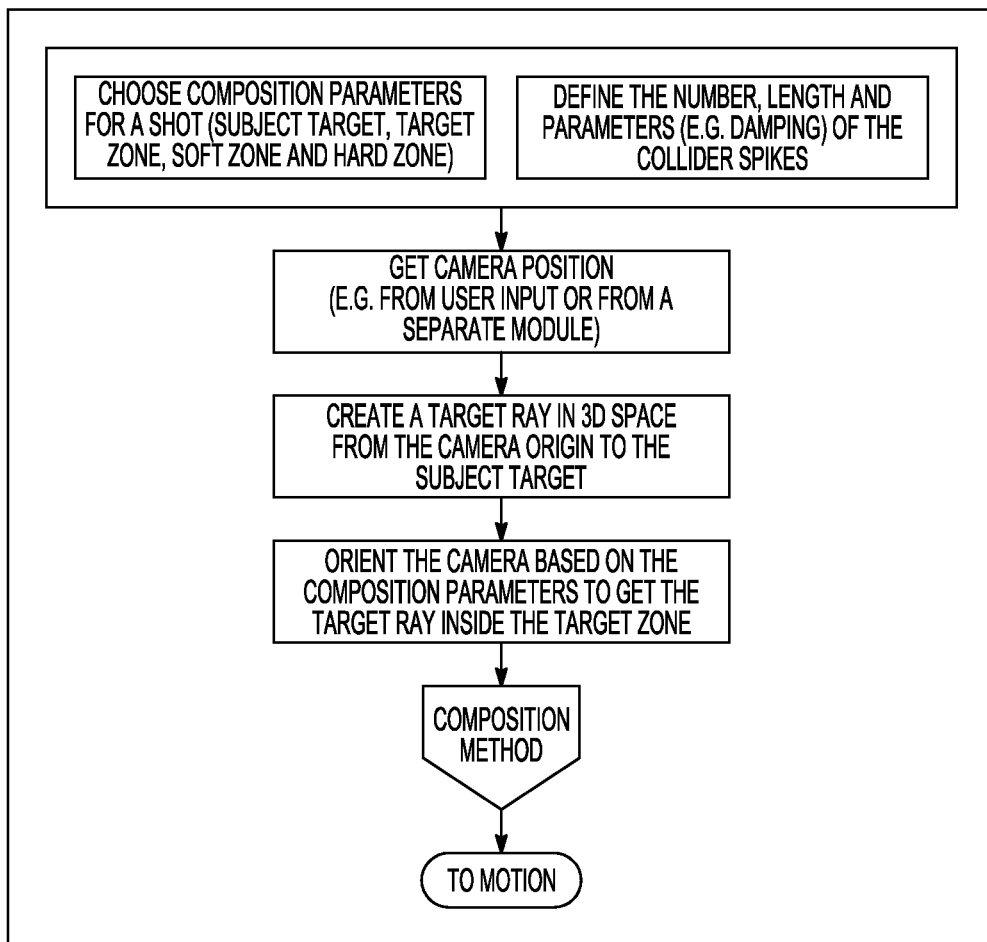
FIG. 6B is a flowchart showing an initiation to a collider method, in accordance with one embodiment.
Figure 6C:
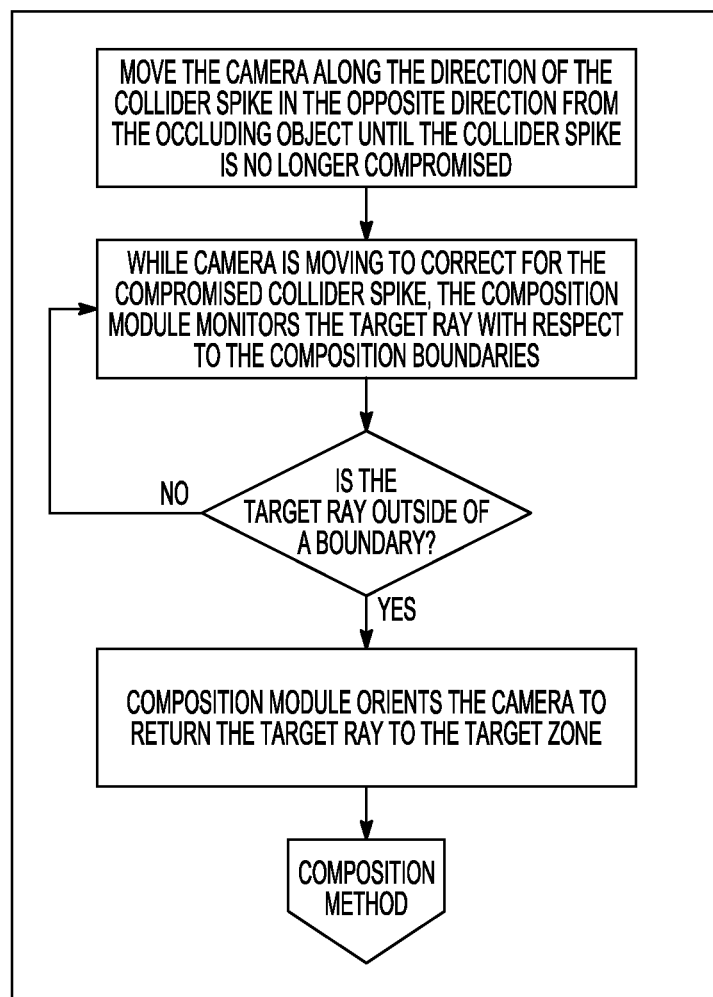
FIG. 6C is a flowchart showing a collider method, in accordance with one embodiment.
Figures 1, 6D:
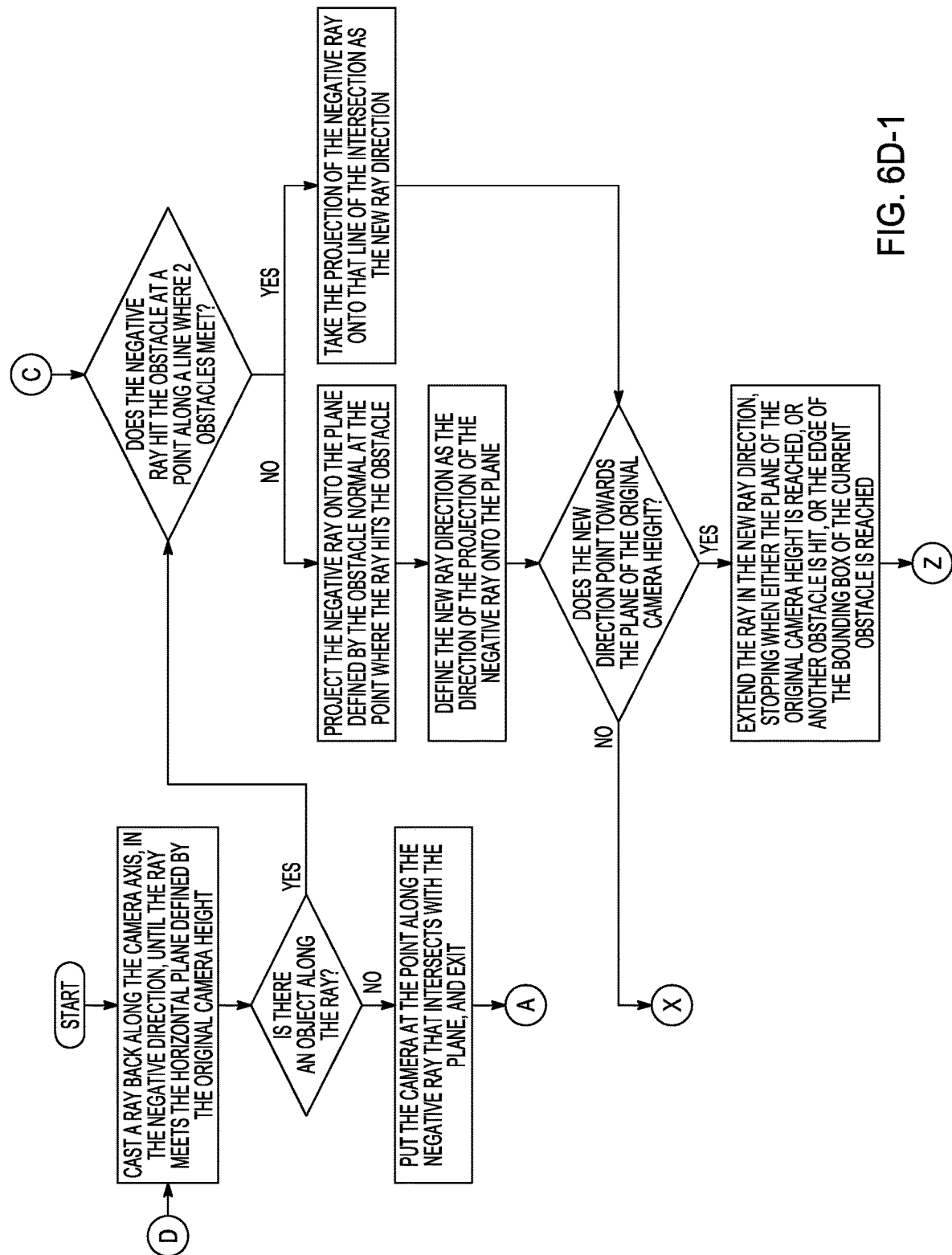
Figures 2, 6D:
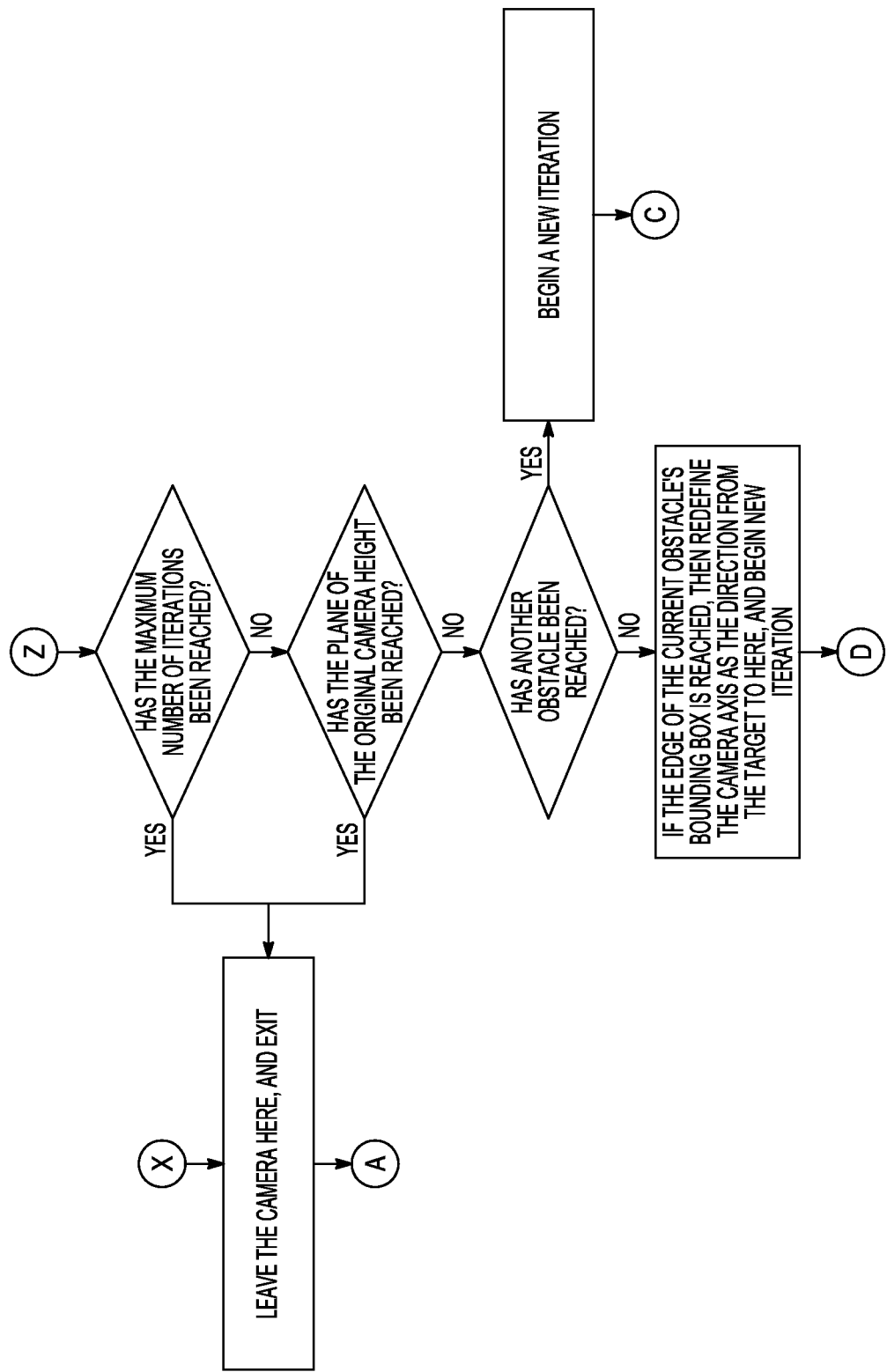

Although FIG. 2 and FIG. 3 shows what appear to be symmetric positioning of the horizontal and vertical boundaries, these boundaries do not have to be positioned symmetrically such that the size of the zones can be asymmetric both left/right and up/down. Furthermore, FIG. 2 and FIG. 3 shows what appear to be linear boundaries at right angles to each other creating a rectangular target zone, a rectangular soft boundary zone and a rectangular hard boundary, as shown in FIG. 2B, the boundaries can be nonlinear and the shape of the zones can have any shape.

The tracking method described herein allows for decoupled tracking along both the vertical and horizontal axis of the screen space. In addition, the tracking method uses time constants for each boundary to determine the amount of time the composition module can use to reorient the camera such that the target will move into the target zone. With the 3 described zones, the composition module only adjusts the camera if it detects a deviation from the desired composition (i.e. if the target is outside of the target zone). Furthermore, the re-orientation of the camera in the soft boundary zone is a graded response based on the amount of deviation from the boundary. The speed of re-orientation is related to the distance from the target zone boundary. This approach allows for a realistically human feel to the camera movement as the closer the target is to the target zone the slower the camera's reaction (and vice versa). This is similar to the movements of cameras controlled by humans.

In an example embodiment, the method uses single precision floating point calculations and produces high quality results. Because of the use of single precision floating point calculations, the computational burden is reduced compared to calculation with double precision floating point calculations. This is very useful for situations where the shot composition must be done on multiple cameras simultaneously. For example, when there are multiple cameras in a scene the specific composition of each camera can be maintained simultaneously using this method without the use of a high-powered computer. For the same reason, the composition method described herein is also very practical for a mobile device where the computation power can be lower than a desktop/laptop computer. In order to preserve floating point accuracy using only single precision, all calculations are performed in camera coordinate space (e.g. local coordinates relative to the camera). Also, instead of using Euler angles and trigonometry to determine the position of the subject on the screen and the orientation of the camera, all orientations and rotation values are computed using Quaternions and unit length vectors.

Figure 4:
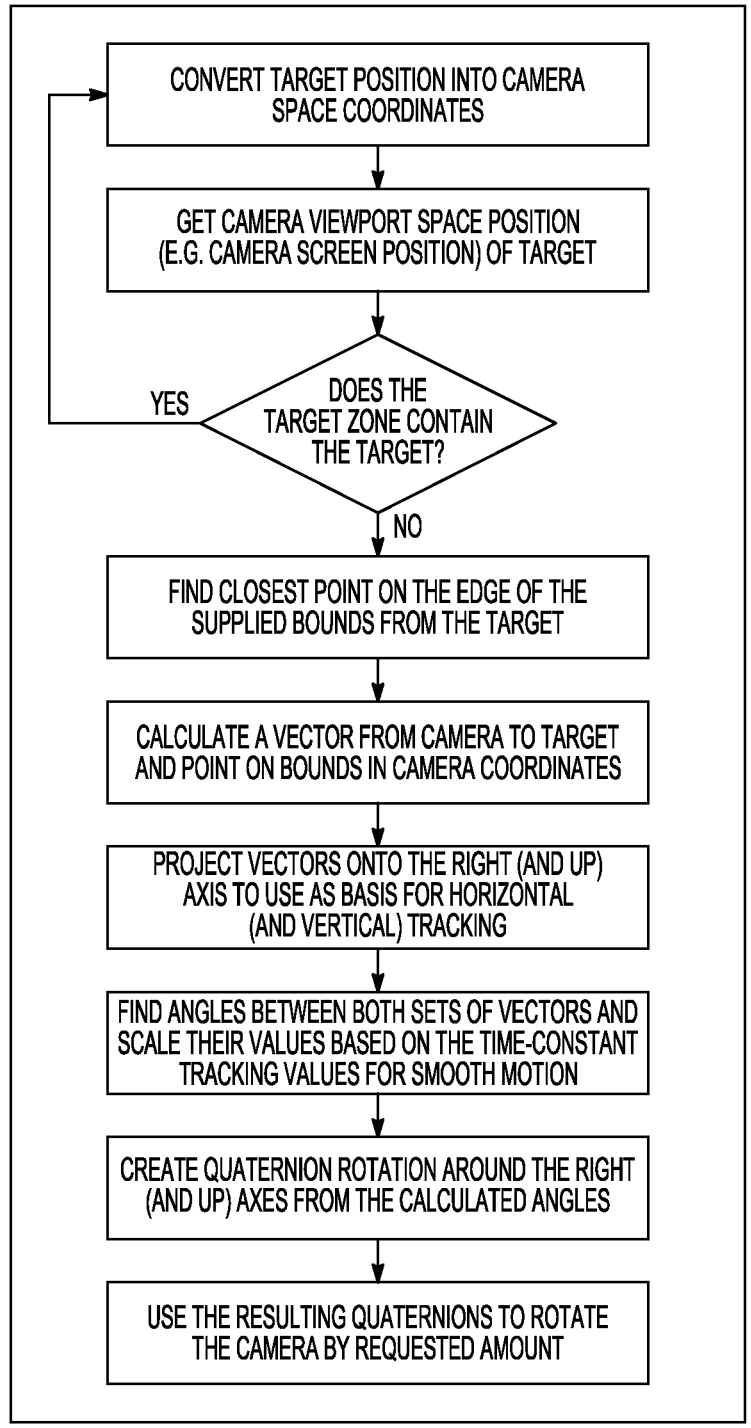
FIG. 4 is a flowchart showing a composition method, in accordance with one embodiment.

In accordance with an embodiment and shown in FIG. 4 is a composition method, wherein the composition module's order of operations for keeping a target within the target zone are as follows for each camera:

First, the composition module converts the target position from 3D world coordinates into 3D camera space coordinates. Then the composition module converts the 3D camera coordinates of the target to a 2D camera viewport space position (e.g. camera screen position). The composition module then compares the target position in screen space with the selected target zone. If the selected target zone (e.g. central bounding region) in viewport space does not contain the target, then the composition module must readjust the camera orientation. However, if the viewport space does contain the target, then no adjustment of the camera orientation is necessary and the composition module can go back to step 1 and monitor the target position. To readjust the camera orientation, the composition module finds the point on the edge of the supplied boundary which is closest from the target so that the camera will rotate on the shortest path which puts the target into the desired composition target zone. The composition module then calculates two vectors; first, a vector from the camera origin to the target and second, a vector from the camera origin to the point on the boundary calculated in the previous step. Both the vectors are calculated in camera coordinates. The composition module then projects the two vectors onto the right axis to use as basis for horizontal tracking and it projects the two vectors onto the up axis to use as a basis for the vertical tracking. The composition module then determines the angle between the two vectors and uses the value to scale the time-constant tracking values for smooth motion using quaternions.

The composition module then creates quaternion rotations around the right axis and the up axis from the calculated angles. The composition module then uses the resulting quaternions to rotate the camera by the requested amount.

The composition module applies this tracking process twice, once for the hard tracking boundary and again for the soft tracking boundary per update (the tracking time for hard boundary is zero, meaning instantaneous).

Also note that the composer module can be applied to a system with a stationary camera and a moving subject, a system with a moving camera and a stationary subject, or a system where both camera and subject are in motion.

In accordance with an embodiment and described herein is a collider system (embodied in part within a collider module) whereby the collider module moves (e.g. changes the position) a camera to avoid an object in a 3D environment wherein the object is occluding the target from the camera's target zone. The collider system can use the composition module system to maintain the composition of a shot (e.g. by changing the orientation of the camera) while the collider system moves the camera position to avoid the occluding object.

Figure 5:
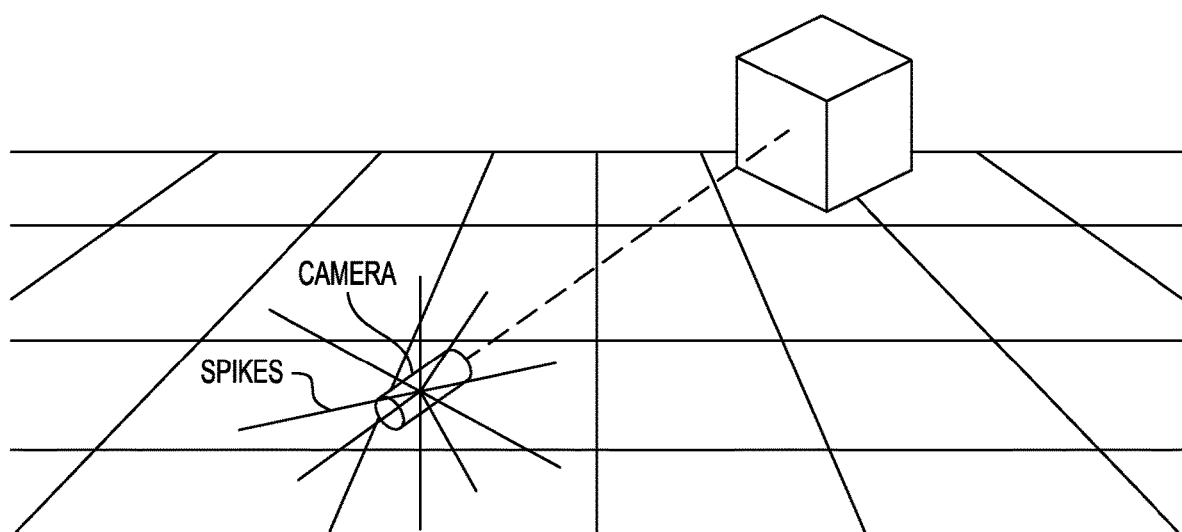
FIG. 5 is a schematic showing collider spikes on a camera, in accordance with one embodiment.

In accordance with an embodiment and shown in FIG. 5, the collider module creates collider spikes on a camera. A collider spike is a rod that extends from a camera and reaches outwards for a distance. A camera can have multiple collider spikes extending at multiple angles. The collider spike length and the direction at which it extends out from the camera can be defined by a user and can be different for each collider spike. Each collider spike can also have an adjustable dampening. The dampening takes effect when a collider spike is compromised (i.e. comes in contact with an object in the 3D environment) and refers to the speed at which the collider module returns the camera to a position where the collider spike is no longer compromised (i.e. is no longer in contact with an object in the 3D environment). Hard dampening moves the camera quickly from a compromised position to a non-compromised position, while soft dampening moves the camera slowly from a compromised position back to a non-compromised position. The collider damping takes some of the jarring abruptness out of collisions between the camera and objects. Collider spikes can be made longer than needed with damping and collisions can be avoided so smoothly that the viewer would not notice. Without dampening the camera can act quite brittle and can instantly stop/start, etc.

The collider module system behavior depends on the type of occlusion that occurs between the camera, the occluding object and the subject of a shot. In accordance with an embodiment and shown in FIGS. 6A-6G, the collider system described herein responds to at least two different types of occlusion. A first type of occlusion relates to the position of the camera body with respect to the occluding object, and more specifically occurs when the object is close enough to the camera body that it compromises one or more collider spikes (i.e. it comes within the length of the collider spike). When one or more collider spikes are compromised, the collider module changes the camera position in order to return the collider spikes to a non-compromised situation. To do this, the collider module moves the camera away from the occluding object along the direction of the compromised collider spike. The compromised collider spike can be considered a vector direction in the 3D virtual space. For example, if the camera has a compromised spike on its left side, then the collider module will move the camera to the right (e.g. along the vector direction of the collider spike) until the collider spike is no longer compromised by the object. In some embodiments, a collider spike is automatically included between the camera and the target, and extending some or all of the distance from the camera and the target, thereby triggering occlusion based on an intervening object. If multiple collider spikes are compromised, then the collider module will move the camera in order to eliminate all the compromised spikes; in other words the collider module will move the camera along the direction of the vector sum of the multiple collider spike directions. In accordance with an embodiment, the collider module will use the composition module to ensure the compositional view of the subject is preserved while the camera is in motion (e.g. while correcting for a compromised spike). The collider module adjusts the position of the camera body while the composition module simultaneously adjusts the camera orientation to keep the composition target in the target zone.

In accordance with an embodiment there is a second type of occlusion that involves compositional preservation wherein the view of the subject from within the target zone is occluded by an object positioned between the camera and the subject. In this second situation the collider module projects a line (referred to as the 'target ray') in the 3D environment that extends from the camera origin to the subject target (e.g. a point on the subject). This target ray usually does not pass the center of the screen since it is adjustable with the camera composition module via the subject target and target zone (e.g. if the user decides to compose a shot with the target zone at the edge of the screen), The target ray can be thought of as a vector in the 3D environment.

In accordance with an embodiment, when the target ray is compromised (e.g. when an object intersects with the target ray), the collider module will move the camera towards the subject along the target ray (e.g. along the target ray vector direction) until the camera is in a position where it is no longer occluded by the object and the target ray is no longer compromised. In some embodiments, this movement happens within a single frame (e.g., the camera jumps to the new position). In other words, the camera is moved forward by the collider module until it has a clear shot of the subject with the proper composition (e.g. using the composition module to maintain the target within the target zone as the camera moves position). In accordance with an embodiment, the length of the target ray can be less than the distance from the camera to the subject so that it ends prior to reaching the subject target. A target ray that ends prior to reaching the subject target eliminates the possibility of intersecting an object so close to the subject that it could not be bypassed while maintaining a good shot. The short target ray also eliminates the possibility of allowing the collider module to zoom the camera so close to the subject that a meaningful composition is impossible (e.g. to avoid an extreme close up). The target ray length can also be defined such that it protrudes past the subject target and emerges on the other side allowing the intersection of the target ray with objects behind the subject.

In accordance with an embodiment and shown in flowchart in FIG. 6D, the collider module attempts to preserve the original camera height by pushing the camera back towards its original position before the target ray was compromised. In some embodiments, this movement happens within a single frame (e.g. the camera jumps to the new position determined by the following method). In other embodiments, the following method to push the camera back occurs less frequently, which may assist in lowering the computational burden. To do this, the collider module casts a ray (referred to herein as the negative ray) back along the camera axis, in the negative direction (e.g., away from the target), until the negative ray meets the horizontal plane defined by the original camera height. If the plane of the original camera height can be reached with no intervening obstacle, put the camera at the point where the negative ray intersects the plane of the original camera height, and exit (e.g., go to point 'A' in FIG. 6A). If an obstacle is encountered, the collider module takes the following steps: step 1, project the negative ray onto the plane defined by the obstacle normal at the point where the negative ray hit the obstacle. Step 2, define the new ray direction as the projection of the negative ray onto the plane defined by the obstacle normal. Initiate a special case for inner corners (e.g. if the negative ray hit the obstacle at a point along a line where 2 obstacles meet), then take the projection of the negative ray onto that line of intersection as the new ray direction. If the new ray direction does not point toward the plane of the original camera height, just leave the camera here, and exit the mode of trying to preserve the camera height. Step 4, the collider module extends the ray in the new ray direction, stopping when either the plane of the original camera height is reached, or another obstacle is hit, or the edge of the bounding box of the current obstacle is reached. If the plane of the original camera height is reached, leave the camera at this point, and exit (e.g., go to point 'A' in FIG.

6A). If a maximum number of iterations has been reached, leave the camera at this point, and exit (e.g., go to point 'A' in FIG. 6A). If another obstacle is reached, begin a new iteration by going back to step 1 (e.g., go to point 'C' in FIG. 6D). If the edge of the current obstacle's bounding box is reached, then redefine the camera axis as the direction from the target to here, and begin a new iteration of trying to preserve the original camera height (e.g., go to point 'D' in FIG. 6D).

Figure 6E:
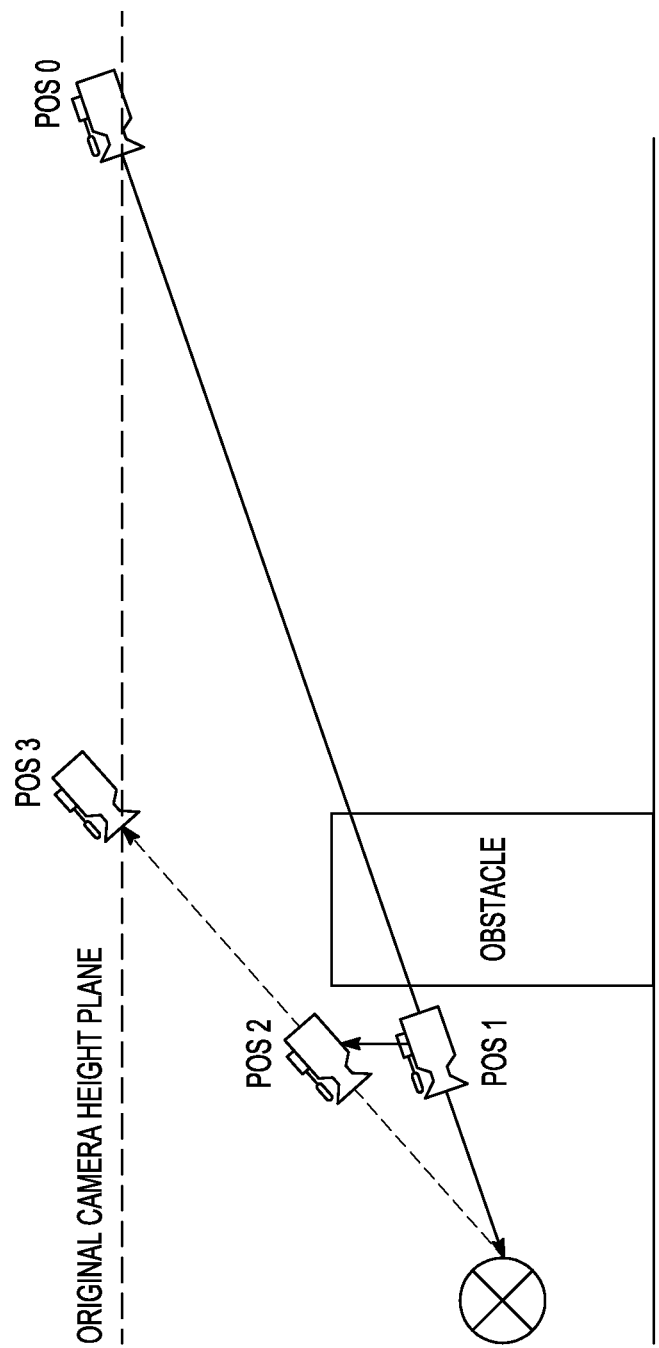
FIG. 6E is a schematic diagram of a virtual environment wherein the collider module moves a camera to avoid an object, in accordance with an embodiment.

In accordance with an embodiment and shown in FIG. 6E is a schematic diagram of a virtual environment showing the camera movement using the method described in FIG. 6D. In this example, at a first frame, a camera is at position 0 (pos 0) when an obstacle obscures the target ray. Before a second frame is simulated and drawn, the collider module moves the camera to position 1 (pos 1) to avoid the obstacle. However, position 1 is much closer to the target and does not maintain the original camera height while still avoiding the obstacle. Accordingly, the collider module attempts to move the camera back to the camera's original position, but that position is blocked by the object. The collider module then pushes the camera up the object wall until it reaches the top of the object at position 2 (pos 2). The collider module then rotates the camera such that the camera axis is again pointing at the target and then pushes the camera back until it is at the original camera height plane in position 3 (pos 3). This movement from pos 1 to pos 3 may be performed within a single standard video frame.

Figures 1, 6F:
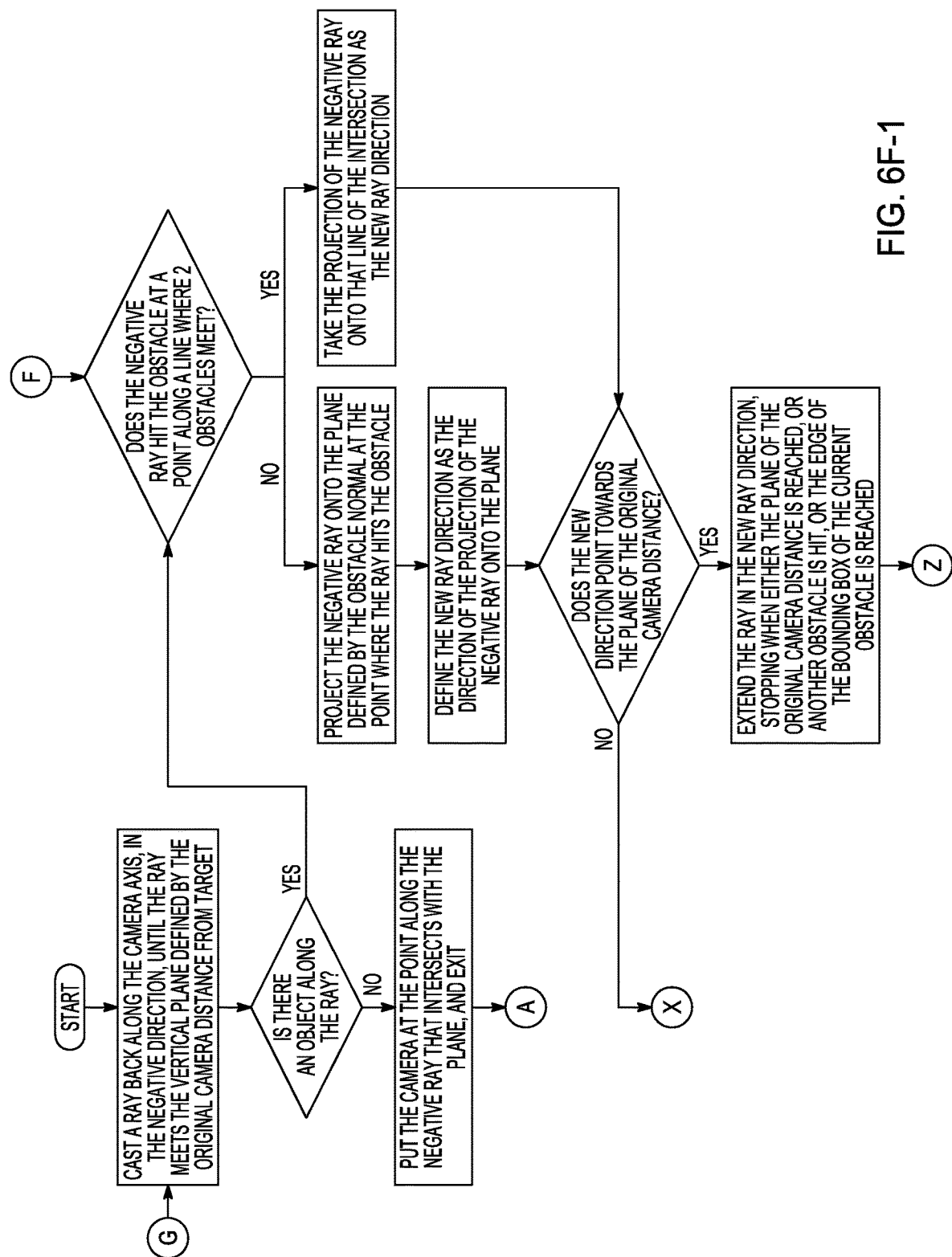

In accordance with an embodiment and shown in a flowchart in FIG. 6F, the collider module attempts to preserve the original camera distance by pushing the camera back towards its original position before the target ray was compromised. In some embodiments, this movement happens within a single frame (e.g., the camera jumps to the new position determined by the following method). In other embodiments, the following method to push the camera back occurs less frequently, which may assist in lowering the computational burden. To do this, the collider module casts a ray (referred to herein as the negative ray) back along the camera axis, in the negative direction (e.g., away from the target), until the negative ray meets the vertical plane defined by the original camera distance from the target. If the plane of the original camera distance can be reached with no intervening obstacle, put the camera at the point where the negative ray intersects the plane of the original camera distance, and exit (e.g. go to point 'A' in FIG. 6A). If an obstacle is encountered, the collider module takes the following steps: step 1, project the negative ray onto the plane defined by the obstacle normal at the point where the negative ray hit the obstacle. Step 2, define the new ray direction as the projection of the negative ray onto the plane defined by the obstacle normal. Initiate a special case for inner corners (e.g., if the negative ray hit the obstacle at a point along a line where 2 obstacles meet), then take the projection of the negative ray onto that line of intersection as the new ray direction. If the new ray direction does not point toward the plane of the original camera distance, just leave the camera here, and exit the mode of trying to preserve the camera distance. Step 4, the collider module extends a ray in the new ray direction, stopping when either the plane of the original camera distance is reached, or another obstacle is hit, or the edge of the bounding box of the current obstacle is reached. If the plane of the original camera distance is reached, leave the camera at this point, and exit (e.g. go to point 'A' in FIG. 6A). If a maximum number of iterations has been reached, leave the camera at this point, and exit (e.g., go to point 'A' in FIG. 6A). If another obstacle is reached, begin a new iteration by going back to step 1 (e.g., go to point 'F' in FIG. 6F). If the edge of the current obstacle's bounding box is reached, then redefine the camera axis as the direction from the target to here, and begin a new iteration of trying to preserve the original camera height (e.g., go to point 'G' in FIG. 6F).

Figure 6G:
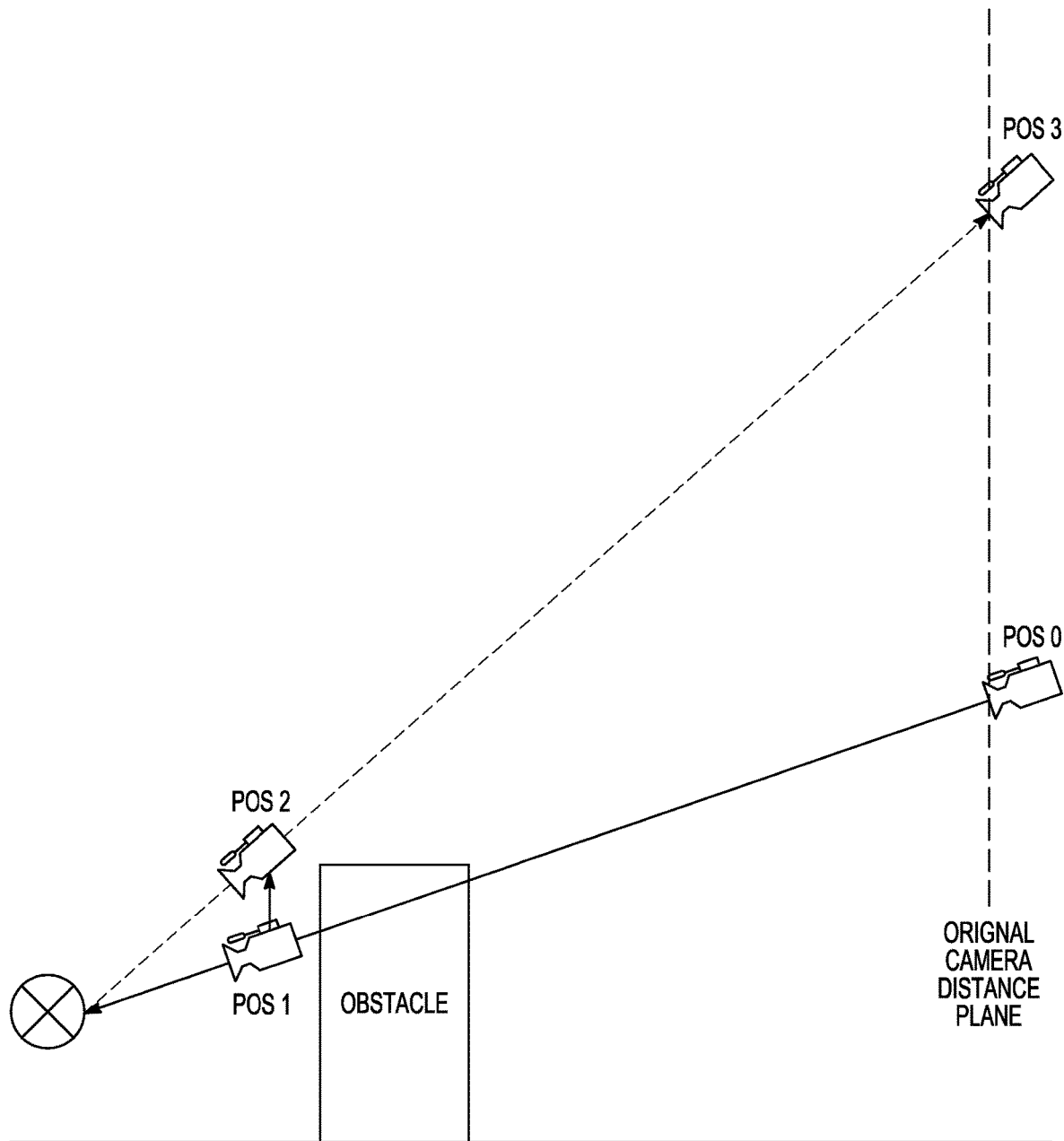
FIG. 6G is a schematic diagram of a virtual environment wherein the collider module moves a camera to avoid an object, in accordance with an embodiment.

In accordance with an embodiment and shown in FIG. 6G is a schematic diagram of a virtual environment showing the camera movement using the method described in FIG. 6F. In this example, at a first frame, a camera is at position 0 (pos 0) when an obstacle obscures the target ray. Before a second frame is simulated and drawn, the collider module moves the camera to position 1 (pos 1) to avoid the obstacle. However, position 1 is much closer to the target and does not maintain the original camera distance to the target while still avoiding the obstacle. Accordingly, the collider module attempts to move the camera back to the camera's original position, but is blocked by the object. According to the method, the collider module pushes the camera up the object wall until it reaches the top of the object at position 2 (pos 2). The collider module then rotates the camera so that the camera axis is again pointing at the target and then pushes the camera back until it is at the original camera distance plane in position 3 (pos 3). This movement from pos 1 to pos 3 may happen within a single standard video frame.

Figure 7A:
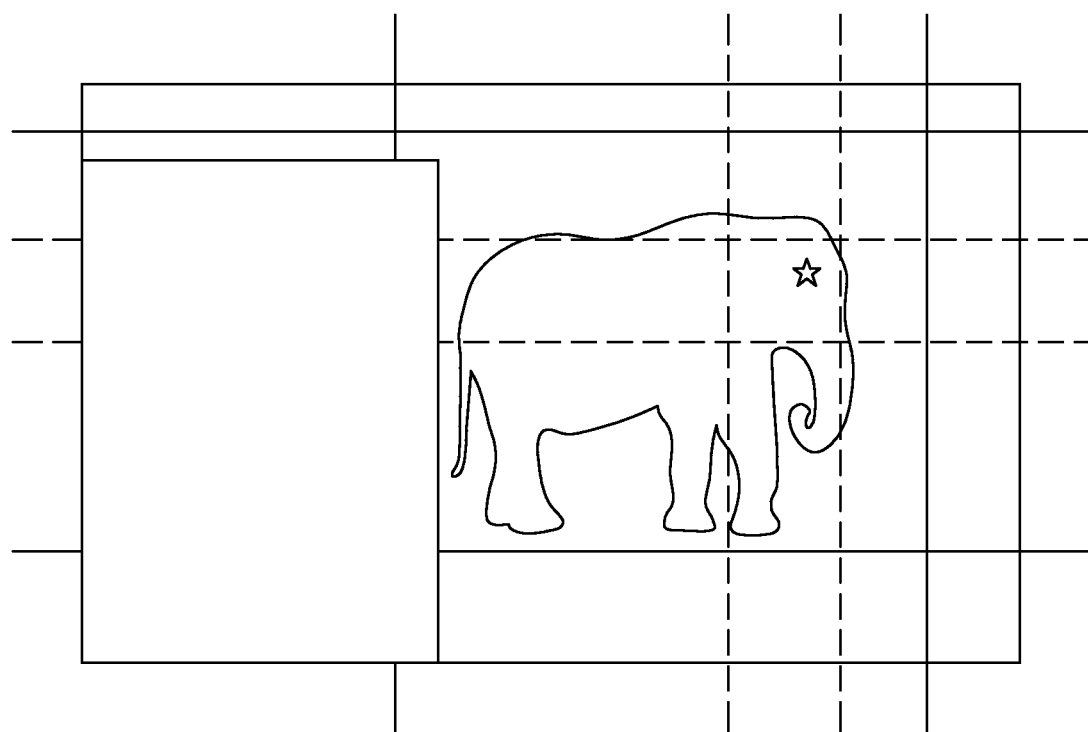
FIGS. 7A, 7B and 7C are schematic diagrams of a camera screen where an occluding object moves across the screen and covers a subject.
Figure 7B:
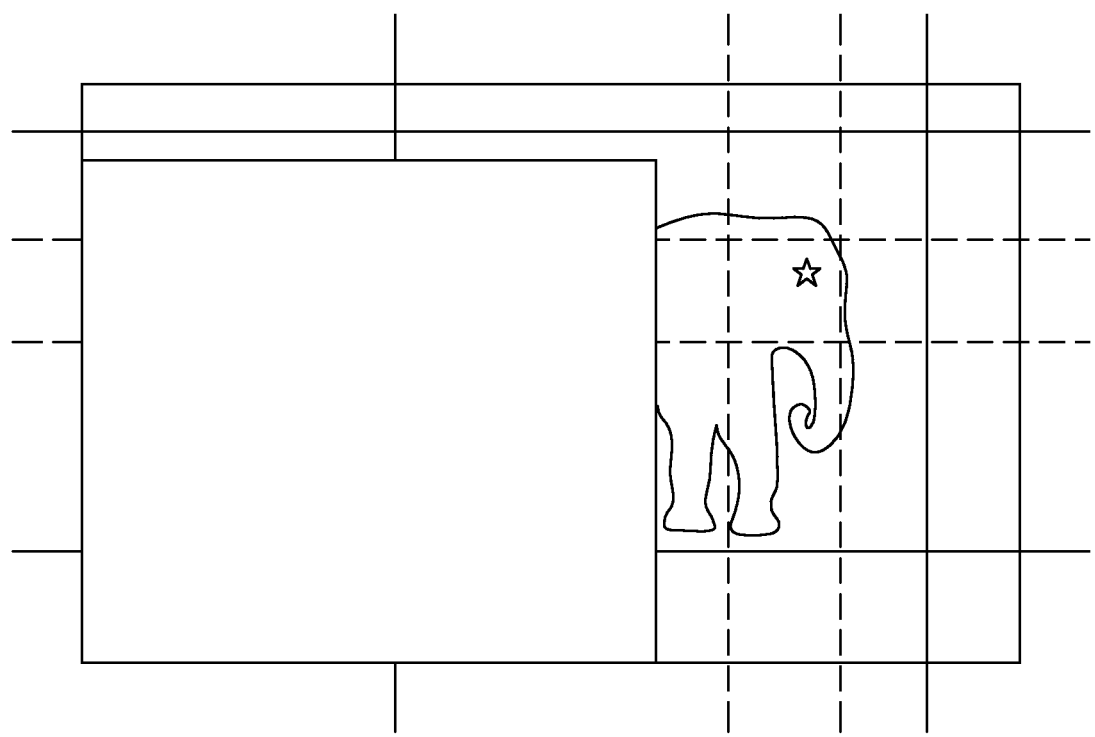
Figure 7C:
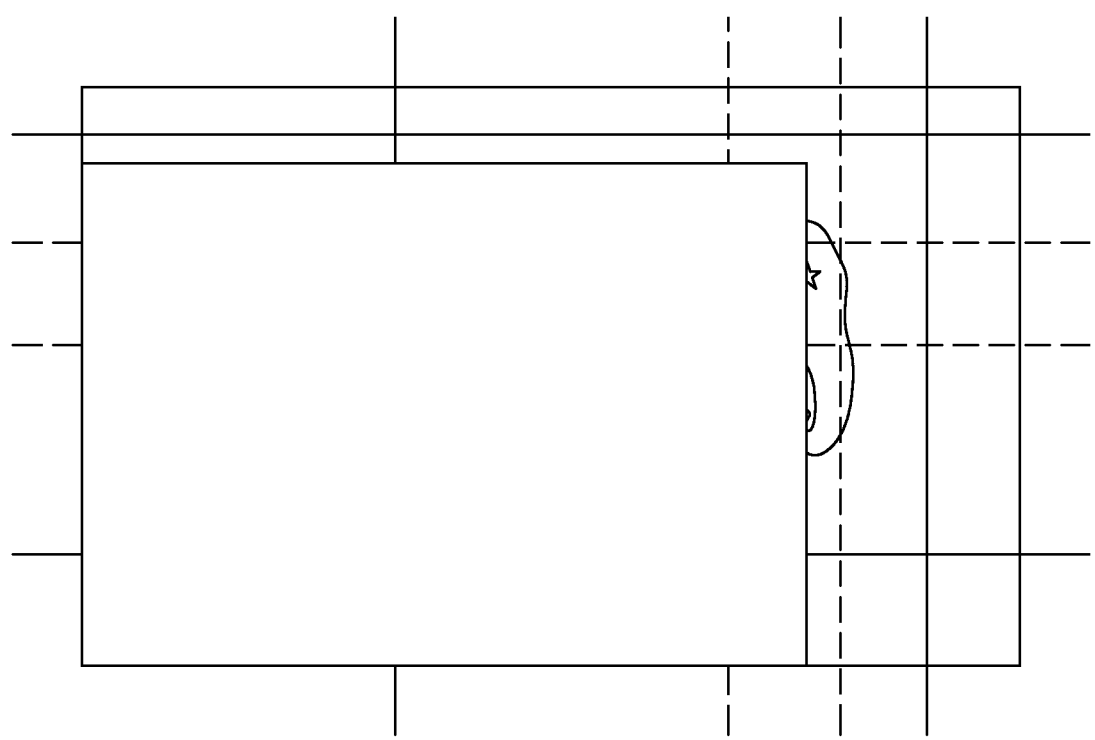

As an example of the collider module reaction to object occlusion, FIGS. 7A, 7B and 7C show three occlusion scenarios wherein an occluding object moves from left to right across a camera screen. In FIG. 7A, the occluding object covers only the left side of the screen and does not occlude any part of the elephant. The collider module would not move the camera in that case. In FIG. 7B, the occluding object covers most of the screen area on the left side of the screen and occludes a large part of the elephant, but still does not occlude the subject target. Again, this would not cause the collider module to move the camera. However, in FIG. 7C, the occluding object covers much of the screen and finally does cover the subject target in the top right of the camera screen. Since the occluding object covers the subject target it would intersect with the target ray and cause the collider module to move the camera towards the subject to get beyond the occluding object.

In some embodiments, the collider module may utilize a minimum obstacle distance when determining whether and when to react based on occluded line of sight. Some occluding objects may be ignored (e.g., no change to camera position) based on the distance between the obstacle and the camera. For example, nearby objects may be ignored if they are less than the minimum obstacle distance from the camera, as they are likely to pass quickly in the foreground. In some embodiments, additional factors may be used when determining whether to react based on occluded line of sight, such as the size of the object, the current trajectory and speed of the camera or target, or a computed occlusion time based on the occluding object and the current trajectory and speed of the camera.

In accordance with an embodiment there is provided a method for camera shot evaluation using the collider module and a special camera referred to herein as a meta camera. The meta camera is a high level camera which contains a plurality of sub-cameras each producing a sub-shot. Each of the sub-cameras can contain or use a collider module. The meta camera can be set up so that each sub-camera has any type of sub-shot (e.g. they do not have to follow any type of cinematic theme). For example, a sub-camera can be procedurally offset from a subject "Back 5 meters and down 1 meter from the face" or it can be a fixed camera in the world, or it can be a free-look camera which has any number of positional and angular constraints/relationships between the sub-camera and the subject.

While the meta camera is completely open to any type of sub-camera configuration, it can be more efficient when the sub-cameras are setup in themes so they all have some kind of conceptual similarity. In accordance with an embodiment, the meta camera can be set up so that all the sub-cameras have sub-shots that are variations on a single conceptual type of camera shot (e.g. head shot, wide shot, long shot, and the like). For example, a meta camera could be set up as a 'head shot' meta camera such that each of the sub-shots was a variation on a head shot of a subject. Each of the head shot sub-cameras would have differing parameters to create different variations of head shots e.g, different angles, distances, field of views from the subject).

In accordance with an embodiment, when implemented (for example in a computer program) the meta camera will evaluate the shot quality of all the sub-cameras it contains, rank them, and provide a single sub-shot with the highest quality ranking. More specifically, when a meta camera is triggered, it will activate all of the sub-cameras and quickly perform an analysis on each of them to determine the 'shot quality' and then only play the highest quality sub-camera. This happens very quickly with a delay of at most one frame.

In an example embodiment, shot quality can be determined as follows: Each sub-camera is first given a perfect score. After initialization of the sub-camera (e.g. the collider module for the sub-camera is activated), the score for the sub-camera is adjusted based on the actions of the collider module for the sub-camera. A score is adjusted downwards if the collider module has to move the sub-camera (e.g. because the sub-camera is blocked from seeing the subject or has something in the way of the sub-shot). The amount of the score adjustment depends on how much the camera has been moved by the collider module. If the sub-camera cannot get a shot of the subject even after movement from the collider module, then the shot is determined to be a failure (e.g. the score could be adjusted to zero). A sub-camera with a high score (e.g. close to the perfect score) will have moved less than a sub-camera with a lower score. A sub-camera which has not been moved by the collider module (e.g. they have a perfect shot) are ranked the highest and retain a perfect score.

In some embodiments, a number of criteria are taken into account when determining shot quality. These criteria may include, for example, whether the target is occluded from the point of view of the camera (e.g. if the collider module had to move a camera), duration of occlusion (if any) (e.g., the longer the duration the poorer the shot quality), whether the camera has been displaced from its ideal position (e.g., due to collision resolution from the collider module), distance from camera to target (e.g. as described below), shot composition (e.g., whether the shot is within the boundaries), the importance of the target in game context (e.g., a target, such as a specific game player, can be ranked in importance by the game logic or directly by a player of the game), or whether cinematic rules are honored by choosing a particular shot (e.g., cinematic rules can apply across multiple shots and so this depends on one or more previous shots, such as whether the new shot violating a cinematic rule).

In some embodiments, the collider module may utilize both shot priority and shot quality as factors when selecting a particular sub-camera view. For example, shot priority may include factors such as which team member or area is in the field of view of the sub-camera (e.g., focusing on the most effective player, or on a particular location central to the game), or the nature of current actions being taken by the players or by the game (e.g., focusing on a fight between players, or when a player picks up an object of interest in the game). As such, the shot priority may be weighted along with shot quality to select a particular sub-camera view. In some embodiments, randomization may be applied based on shot quality or shot priority. For example, if multiple sub-cameras have similar-scoring shot quality or shot priority, the collider module may randomize which sub-camera view to select, thereby providing a variety of camera views without necessarily sacrificing shot quality or shot priority.

In some embodiments, the collider module identifies a target distance and evaluates the shot quality of the various sub-cameras based on that target distance. For example, the user may prefer a 20-yard view of the action. As such, the collider module may select sub-cameras based on the target distance, weighting sub-camera views around 20 yards above those farther away or closer. In some embodiments, the collider module may utilize a linear decay when evaluating target distance as a factor for shot quality (e.g., up to some pre-determined multiple of the target distance).

In some embodiments, an orbital transposer is utilized with a follow camera on the target. The composition module may add additional controls for heading bias, follow based on position delta, vector, or world heading, multiple blend modes, and per-axis damping controls. A configurable Gaussian filter may be used to smooth velocity determination. It may be advantageous to distill or smooth out certain instantaneous movements (e.g., small jerking or twitching of a car coming to a stop) and focus the camera view on the more important movements of the target. A low-pass Gaussian filter may be utilized to smooth out such small movements.

In some embodiments, the composition module may automatically adjust the field of view of a camera based on subject distance to keep objects the same size on screen. For example, the composition module may adjust the field of view (e.g., of a follow camera) to maintain the size of the head of a target to be of a certain size. As such, object size between cuts may be controlled even when distances change, or when characters move around. In some embodiments, the world size of frame coverage may be configured, along with a target distance. The composition module may adjust the field of view dynamically to maintain the size at the target distance. Damping settings may allow control of temporal tightness of the change.

In some embodiments, the composition module may utilize a state-driven camera view to provide for code-free linking of cameras and animation states. A developer may trigger different camera behaviors for various animations. For example, a "handheld camera" may be triggered when a character sprints. When an animation target is set (e.g., when an animation sequence is set as a target by the developer), the composition module scans an animation state machine associated with that animation target searching for hierarchical states and creates a table with all the states at all hierarchy levels). The composition module then associates specific virtual cameras with each state. The association may be done via a user interface that allows each state to be connected with a specific virtual camera, or the association may be rule based so that all states of a certain type are connected with a specific virtual camera. During a game, when a state becomes active, the associated virtual camera is then activated by the composition module. If there is no virtual camera associated with a particular state, then that state transition is ignored and the current active camera remains. In some embodiments, custom blending rules may be provided for the virtual camera transitions.

With this functionality between meta camera, collider module and shot evaluation, it is possible to create multiple meta cameras each containing multiple sub-cameras in order to create a system where you can always cut to a good angle of a subject no matter what is happening.

FIG. 8A is a screenshot illustrating a user interface panel for a state driven camera. This panel allows the user to control the link between an animation state and a virtual camera, as well as the blending between shots.

Figure 8B:
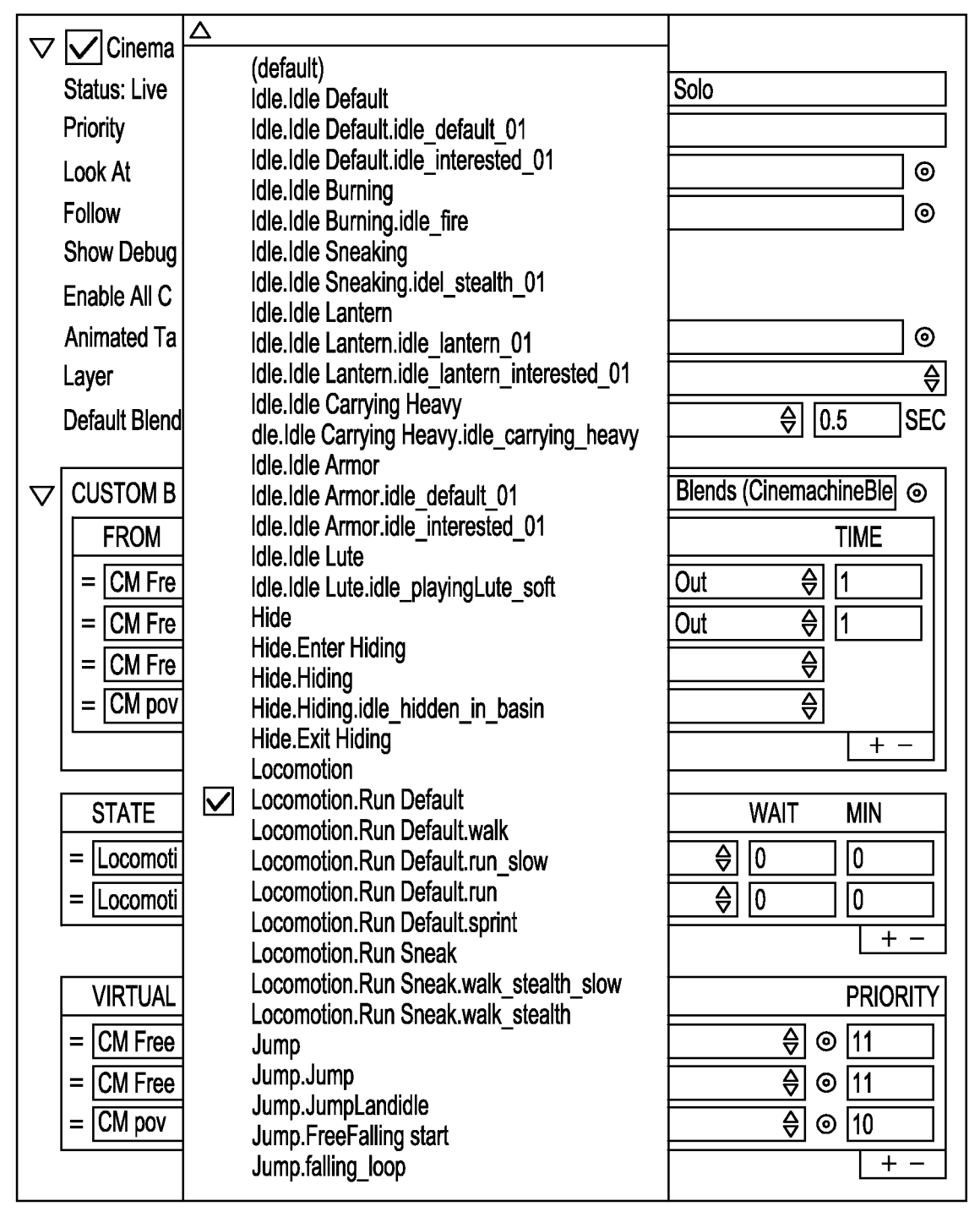

FIG. 8B is a screenshot illustrating a dynamically populated drop-down list of states in a game (e.g., when a user clicks on a state button). The user can choose any state available in the list.

FIG. 8C is a screenshot illustrating the result of clicking on the camera button. Clicking on Camera shows all the cameras in the scene and allows the user to choose any camera and link it with any chosen state. This allows the linking of any specific state with any specific camera (e.g., without coding by the user).

FIG. 8D is a screenshot illustrating how state driven cameras may be blended together (e.g., from a shot on camera 1 to a shot on camera 2). The blending may be defined by the user in this user interface using a component referred to in the figure as a custom blend.

FIG. 8E is a screenshot illustrating a user defined list of all the cameras which are to be exposed to the state driven camera (e.g., defining which cameras are seen by the state driven camera) with controls for the priority. This is referred to in the figure as virtual camera children. This allows the user to control the priority of each camera and to provide better clarity.

FIG. 8F is a screenshot illustrating controls for overall priority of a single state driven camera system. In some embodiments, there can be many state camera driven systems working on the same game, each having a priority with respect to the others, and with their child cameras having their own priorities under each state driven camera system.

Figure 9:
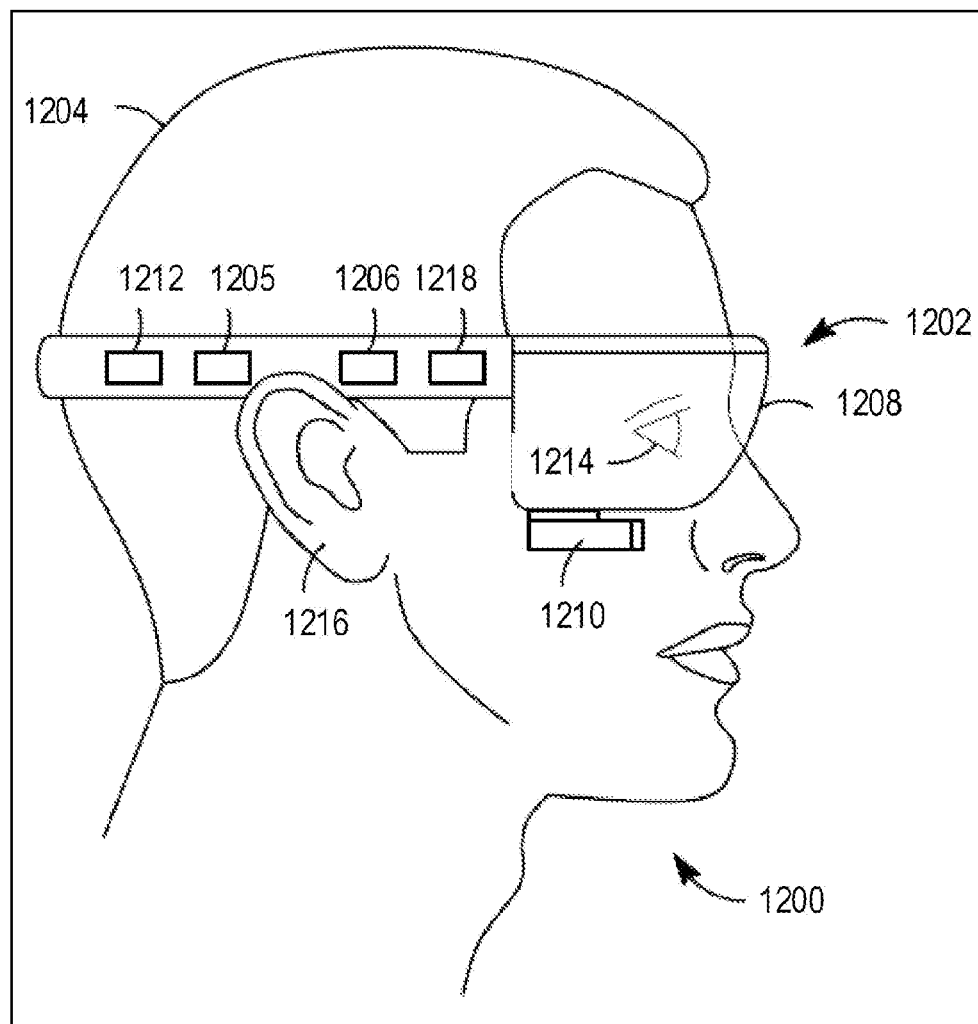
FIG. 9 is a diagram of an example head-mounted display (HMD) worn by a user.

FIG. 9 is a diagram of an example head-mounted display (HMD) 1202, worn by a user (or "wearer") 1200. In the example embodiment, the user 1200 (e.g., a game developer or game player) experiences a VR environment or augmented reality (AR) content (e.g., a mixed reality environment) while wearing the HMD 1202. In the example embodiment, the HMD device 1202 may include an opaque visor 1208 which may obscure the wearer 1200's view of the real world, and which may display a complete virtual environment to the wearer 1200. In other embodiments, the HMD device 1202 includes a transparent or semi-transparent visor (or "lens", or "lenses") 108 through which the wearer 1200 views their surroundings (also herein referred to also as "the real world"). It should be understood that the visor 1208 is illustrated in FIG. 9 as transparent for purposes of illustration but, as described above, the visor 1208 may be opaque in some embodiments.

In the example embodiment, the HMD 1202 also includes a display device 1218 that renders graphics (e.g., virtual objects) onto the visor 1208. As such, the visor 1208 acts as a "screen" or surface on which the output of the display device 1218 appears, and through which the wearer 1200 experiences virtual content. In some embodiments, the HMD 1202 may present two different projections via the visor (e.g., one for each eye). The display device 1218 is driven or controlled by one or more GPUs 1206 or holographic projection units (HPUs). The GPU 1206 processes aspects of graphical output that assists in speeding up rendering of output through the display device 1218.

In the example embodiment, the HMD device 1202 also includes one or more central processing units (CPUs) 1205 that may execute some of the operations and methods described herein. The HMD device 1202 also includes an audio device 1212 (e.g., speakers, not separately depicted) that is configured to present audio output to the wearer 1200 (e.g., via ears 1216 of the user 1200). While not separately shown, the HMD device 1202 also includes wired or wireless network adapters (e.g., Wi-Fi, Bluetooth, cellular) that facilitate communication between the HMD and other computing devices described herein.

In some embodiments, the HMD device 1202 includes a digital camera device 1210. The digital camera device (or just "camera") 1210 is a forward-facing video input device that is oriented so as to capture at least a portion of a field of view (FOV) of the wearer 1200. In other words, the camera 1210 captures or "sees" an angle of view of the real world based on the orientation of the HMD device 1202 (e.g., similar to what the wearer 1200 sees in the wearer 1200's FOV when looking through the visor 1208). The camera devices 1210 may be configured to capture real-world digital video around the user 1200 (e.g., a field of view, a peripheral view, or a 360° view around the wearer 1200). The camera devices 1210 may be used to capture digital video of the real-world environment around the user 1200. In some embodiments, output from the digital camera device 1210 may be projected onto the visor 1208 (e.g., in opaque visor embodiments), and may also include additional virtual content (e.g., added to the camera output). In some embodiments, the camera 1210 may be a depth camera, or the HMD device 1202 may otherwise include a depth sensor, capturing depth information for objects within the FOV of the user 1200.

In some embodiments, the HMD device 1202 may include one or more sensors (not separately shown), or may be coupled in wired or wireless communication with the sensors (e.g., via near-field communication (NFC) with a wrist-wearable device also worn by the wearer 1200). For example, the HMD 1202 may include motion or position sensors configured to determine a position or orientation of the HMD 1202 or position of nearby real-world objects. In some embodiments, the HMD device 1202 may include a microphone for capturing audio input (e.g., spoken vocals of the user 1200).

In some embodiments, the HMD 1202 may be similar to virtual reality HMDs such as the Oculus Rift™, The HTC Vive™, The Playstation VR™, and the like. In some embodiments, the HMD 102 may be similar to augmented reality HMDs such as Google Glass®, Microsoft HoloLens®, Magic Leap™ HMD, Meta™ HMD and so forth. In some embodiments, the HMD 1202 may also include one or more sensors (not shown), such as a global positioning system (GPS) receiver (e.g., for determining a GPS location of the user device 1202), biometric sensors (e.g., for capturing biometric data of the user 1200), motion or position sensors (e.g., for capturing position data of the user 1200 or other objects), a depth camera (e.g. using LIDAR), or an audio microphone (e.g., for capturing sound data). Some sensors may be external to the HMD 1202, and may be configured to wirelessly communicate with the HMD 1202 (e.g., such as used in the Microsoft Kinect®, Vive Tracker™, MIT's Lidar sensor, or MIT's wireless emotion detector).

In some embodiments, the user 1200 may hold one or more hand tracking devices ("handhelds") (not separately shown in FIG. 9) (e.g., one in each hand). The handhelds provide information about the absolute or relative position and orientation of a user's hands and, as such, are capable of capturing hand gesture information. The handhelds may be configured to operate directly with the HMD 1202 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 1200 may wear one or more wearable hand tracking devices (e.g., motion tracking gloves, not shown), such as those made commercially available by Manus VR (Netherlands). In still other embodiments, hand motion of the user 1200 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 1202 is mounted on a head 1204 of the wearer, and over both eyes 1214 of the wearer 1200, as shown in FIG. 9. The wearer 1200 may be presented with a virtual environment or a mixed reality environment which may be experienced via the HMD 1202 and handhelds as described herein. Further, the systems described herein (not separately shown in FIG. 9) may be used in conjunction with the HMD 1202, as described herein. For example, the composition module and the collider module may be used to control one or more virtual cameras in a second virtual environment, wherein the output of the one or more virtual cameras is displayed to the wearer 1200 via a virtual screen within the virtual environment or mixed reality environment experienced via the HMD 1202. The virtual screen could be floating in the environment (e.g., fixed relative to the motion of the wearer 1200) or pinned to an object in the virtual environment or mixed reality environment. For example, in a mixed reality environment, the virtual screen can be an augmented reality virtual projection on a real-world wall. In a virtual reality environment, the virtual screen can be a virtual projection on a virtual wall. The second virtual environment can include any 3D virtual environment wherein a virtual camera can operate (e.g., controlled by a collider module and composition module), including a video game environment (live or recorded), a 3D simulation environment, and a 3D movie environment. As such, the wearer 1200 could experience a mixed reality environment sitting on a couch in a room while watching a virtual screen projected onto a wall near the couch, and wherein the virtual screen displays a live video game environment (e.g., of a live online multiplayer video game) whereby the view of the live video game environment is seen through one or more virtual cameras in the video game environment controlled by a collider module and composition module.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 10:
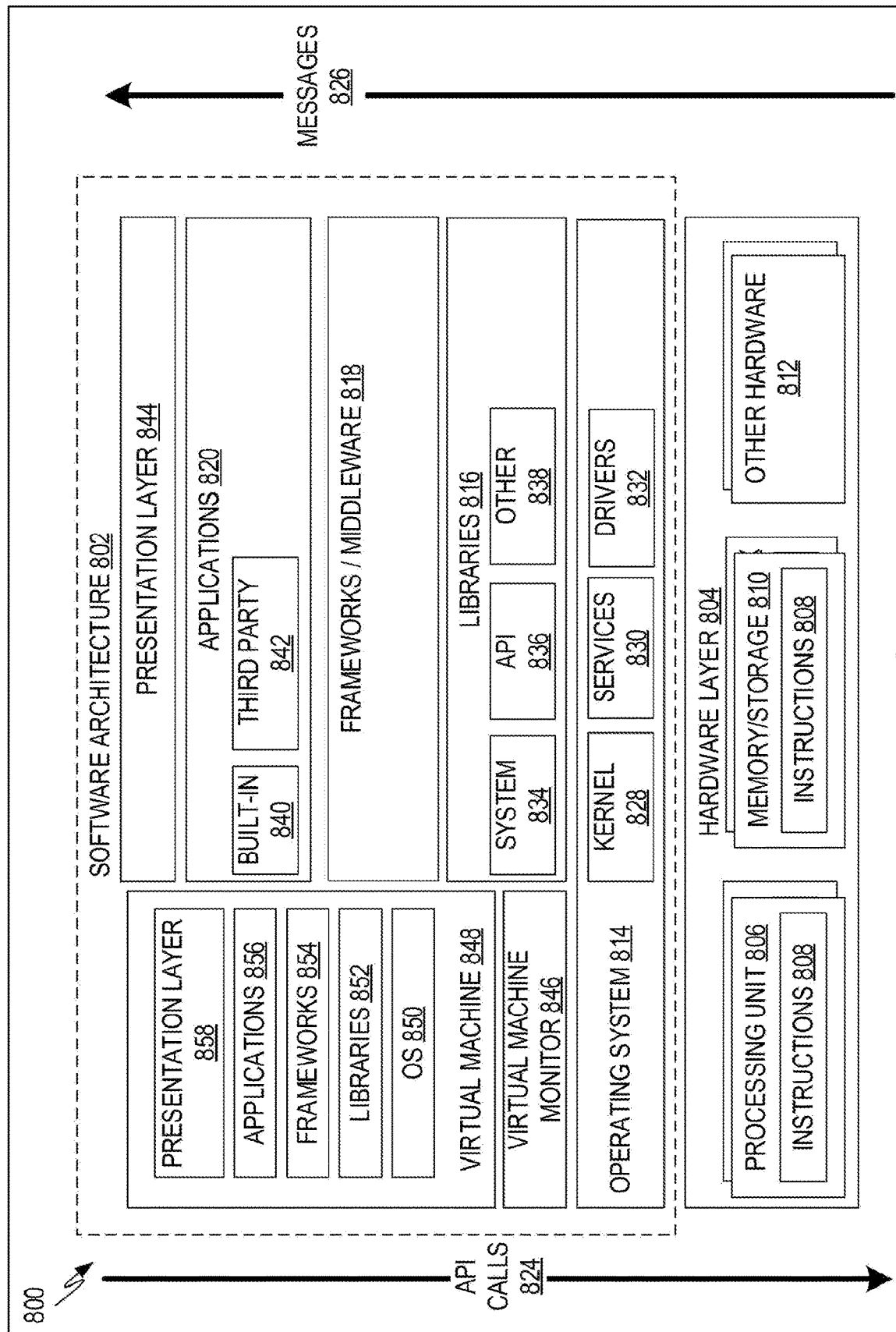
FIG. 10 is a block diagram illustrating an example software architecture, which may be used in conjunction with various hardware architectures described herein.

FIG. 10 is a block diagram 800 illustrating an example software architecture 802, which may be used in conjunction with various hardware architectures herein described. FIG. 8 is a non-limiting example of a software architecture and it will be appreciated that many other architectures may be implemented to facilitate the functionality described herein. The software architecture 802 may execute on hardware such as a machine 900 of FIG. 11 that includes, among other things, processors 910, memory 930, and input/output (I/O) components 950. A representative hardware layer 804 is illustrated and can represent, for example, the machine 900 of FIG. 11. The representative hardware layer 804 includes a processing unit 806 having associated executable instructions 808. The executable instructions 808 represent the executable instructions of the software architecture 802, including implementation of the methods, modules and so forth described herein. The hardware layer 804 also includes memory/storage 810, which also includes the executable instructions 808. The hardware layer 804 may also comprise other hardware 812.

In the example architecture of FIG. 8, the software architecture 802 may be conceptualized as a stack of layers where each layer provides particular functionality. For example, the software architecture 802 may include layers such as an operating system 814, libraries 816, frameworks or middleware 818, applications 820 and a presentation layer 844. Operationally, the applications 820 and/or other components within the layers may invoke application programming interface (API) calls 824 through the software stack and receive a response as messages 826. The layers illustrated are representative in nature and not all software architectures have all layers. For example, some mobile or special purpose operating systems may not provide the frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be used by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) provide a higher-level common infrastructure that may be used by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any an application developed using the Android™ or iOS™ software development kit (SDK) by an entity other than the vendor of the particular platform, and may be mobile software running on a mobile operating system such as iOS™, Android™ Windows® Phone, or other mobile operating systems. The third-party applications 842 may invoke the API calls 824 provided by the mobile operating system such as operating system 814 to facilitate functionality described herein.

The applications 820 may use built-in operating system functions (e.g., kernel 828, services 830 and/or drivers 832), libraries 816, or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures use virtual machines. In the example of FIG. 8, this is illustrated by a virtual machine 848. The virtual machine 848 creates a software environment where applications/modules can execute as if they were executing on a hardware machine (such as the machine 900 of FIG. 11, for example). The virtual machine 848 is hosted by a host operating system (e.g., operating system 814) and typically, although not always, has a virtual machine monitor 846, which manages the operation of the virtual machine 848 as well as the interface with the host operating system (i.e., operating system 814). A software architecture executes within the virtual machine 848 such as an operating system (OS) 850, libraries 852, frameworks 854, applications 856, and/or a presentation layer 858. These layers of software architecture executing within the virtual machine 848 can be the same as corresponding layers previously described or may be different.

Figure 11:
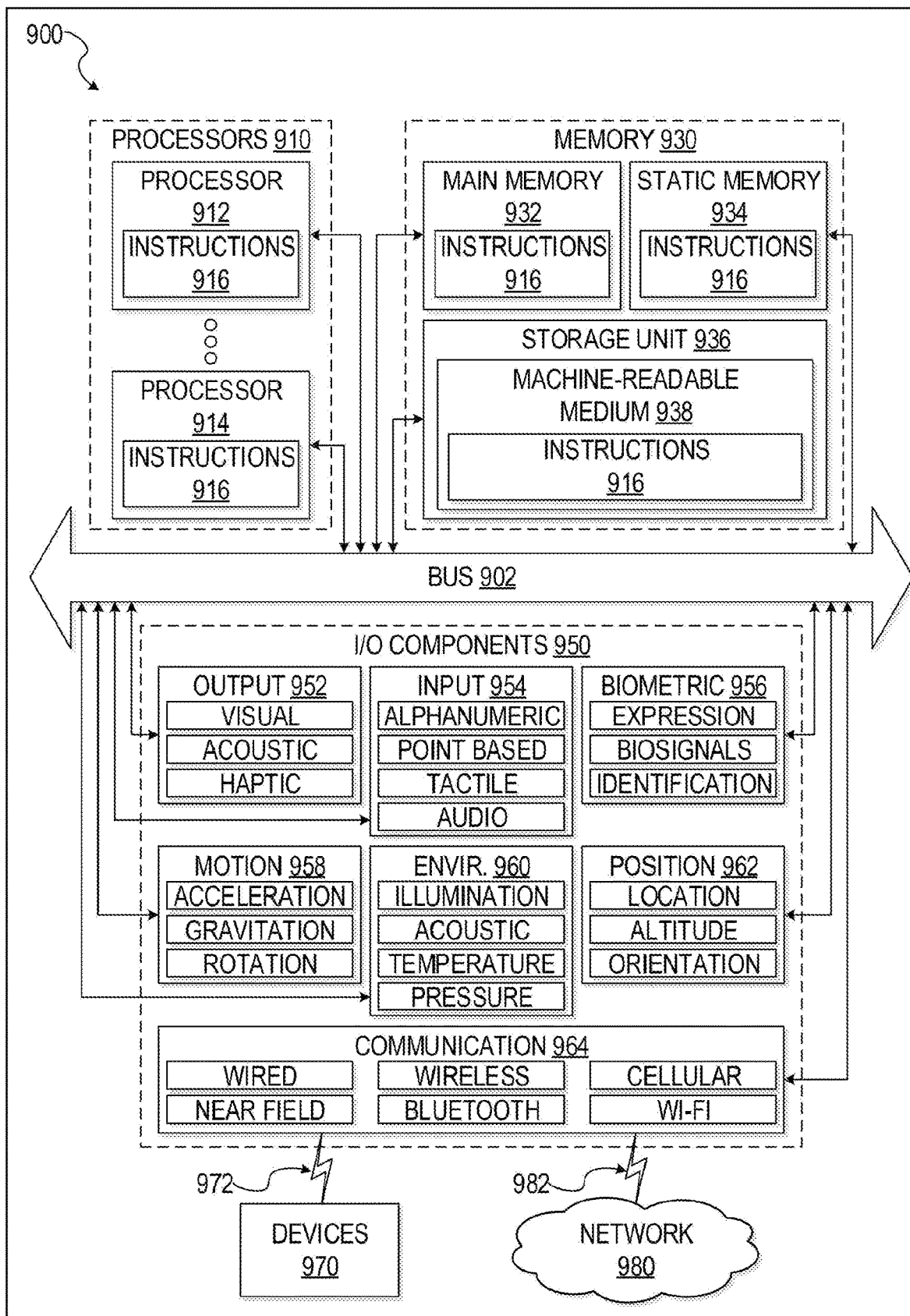
FIG. 11 is a block diagram illustrating components of a machine 900, according to some example embodiments, configured to read instructions from a machine-readable medium (e.g., a machine-readable storage medium) and perform any one or more of the methodologies discussed herein.

FIG. 11 is a block diagram illustrating components of a machine 900, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 11 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines that individually or jointly execute the instructions 916 to perform any one or more of the methodologies discussed herein.

The machine 900 may include processors 910, memory 930, and input/output (I/O) components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processor that may comprise two or more independent processors (sometimes referred to as "cores") that may execute instructions contemporaneously. Although FIG. 11 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory, such as a main memory 932, a static memory 934, or other memory, and a storage unit 936, both accessible to the processors 910 such as via the bus 902. The storage unit 936 and memory 932, 934 store the instructions 916 embodying any one or more of the methodologies or functions described herein. The instructions 916 may also reside, completely or partially, within the memory 932, 934, within the storage unit 936, within at least one of the processors 910 (e.g., within the processor's cache memory), or any suitable combination thereof, during execution thereof by the machine 900. Accordingly, the memory 932, 934, the storage unit 936, and the memory of processors 910 are examples of machine-readable media 938.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 950 may include a wide variety of components to receive input, provide output, produce output, transmit information, exchange information, capture measurements, and so on. The specific input/output (I/O) components 950 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 950 may include many other components that are not shown in FIG. 11. The input/output (I/O) components 950 are grouped according to functionality merely for simplifying the following discussion and the grouping is in no way limiting. In various example embodiments, the input/output (I/O) components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 962, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
one or more computer processors;
one or more computer memories;
a set of instructions incorporated into the one or more computer memories, the set of instructions configuring the one or more computer processors to perform operations for changing an orientation of a virtual camera to keep a part of a subject within a target zone on a two-dimensional view screen of the virtual camera, the operations comprising:
associating a soft boundary zone on the two-dimensional view screen with the target zone, the target zone occupying a first region of the two-dimensional view screen, the soft boundary zone occupying a second region of the two-dimensional view screen, the first region lying within the second region; and
based on a detection that the part of the subject has moved to a location on the two-dimensional view screen outside the soft boundary zone, determining a tracking speed for reorienting the virtual camera, the determining of the tracking speed based on a distance of the part of the subject from the soft boundary zone, wherein the tracking speed gets slower as the distance gets closer to the target zone and the tracking speed gets faster as the distance gets farther from the target zone, and performing the changing of the orientation of the virtual camera to bring the part of the subject back into the target zone at the tracking speed.

2. The system of claim 1, the operations further including:
associating a hard boundary zone on the two-dimensional view screen with the target zone, the hard boundary zone being larger than and including the soft boundary zone, the hard boundary zone occupying a third region of the two-dimensional view screen; and
based on a detection that the part of the subject has moved to a location on the two-dimensional view screen that is outside the hard boundary zone associated with the target zone, setting the tracking speed above a predetermined threshold, and performing the changing of the orientation to bring the part of the subject back to the edge of the hard boundary zone substantially immediately.

3. The system of claim 1, further comprising a collider module incorporated into the one or more computer memories, the collider module configured to move the virtual camera forward in a 3D environment on a target ray associated with the virtual camera to avoid an obstacle within the 3D environment that is in contact with the target ray, the target ray extending from an origin of the virtual camera through the target zone on the two-dimensional view screen of the virtual camera to 3D coordinates within the 3D environment associated with the part of the subject, the forward movement including moving the virtual camera on the target ray to a point between the obstacle and the part of the subject.

4. The system of claim 3, wherein the collider module is further configured to move the virtual camera to an original height associated with the virtual camera prior to the obstacle contacting the target ray;
wherein the moving includes iterating over a series of steps, the series of steps including:
casting a negative ray along the target ray, in a direction away from the subject, moving the virtual camera along the negative ray until the negative ray meets a horizontal plane defined by the original height or encounters an object;
based on an object being encountered, defining a new ray as a projection of the negative ray onto a plane defined by a surface normal at a point where the negative ray hits the object, moving the virtual camera along the new ray, stopping when either the horizontal plane is reached, a second object is hit or an edge of a bounding box of the object is reached;
based on the second object being hit, repeating the moving of the virtual camera;
based on the edge of the bounding box being reached, redefining the target ray as a direction from the part of the subject to a location of the camera, and repeating the moving of the virtual camera; and
based on the negative ray or the new ray hitting the horizontal plane at a point, moving the camera to the point.

5. The system of claim 3, further comprising a composition module and an additional collider module incorporated into to the one or more computer memories, the composition module and the additional collider module configured to perform operations for changing an orientation and position of an additional virtual camera to keep the part of the subject within a target zone associated with the additional virtual camera, the virtual camera and the additional virtual camera comprising a meta camera, the meta camera configured to select either the virtual camera or the additional virtual camera based on a score of a shot of the part of the subject captured by the virtual camera and a score of a shot of the part of the subject captured by the additional virtual camera.

6. The system of claim 5, wherein the score of the shot captured by a virtual camera is determined by one or more of the following:
an amount of displacement given to the virtual camera;
an amount of difference between a distance from the part of the subject to the virtual camera and a predetermined distance value; and
an amount of change of orientation given to the virtual camera.

7. The system of claim 5, wherein a plurality of meta cameras are created, with each meta camera from the plurality of meta cameras associated with a different cinematographic shot type, and each virtual camera within a meta camera of the plurality of meta cameras providing a variation of the shot type associated with the meta camera.

8. The system of claim 3, wherein the composition module may adjust a field of view of the virtual camera based on a distance between the part of the subject and the virtual camera in order to minimize changes in a size of the subject on the two-dimensional view screen.

9. The system of claim 5, wherein the additional virtual camera has one or more of the following which is different from the virtual camera:
a location;
an orientation; and
a shot type.

10. A non-transitory computer-readable medium storing a set of instructions that, when executed by one or more computer processors, cause the one or more computer processors to perform operations for changing an orientation of a virtual camera to keep a part of a subject within a target zone on a two-dimensional view screen of the virtual camera, the operations comprising:
associating a soft boundary zone on the two-dimensional view screen with the target zone, the target zone occupying a first region of the two-dimensional view screen, the soft boundary zone occupying a second region of the two-dimensional view screen, the first region lying within the second region; and based on a detection that the part of the subject has moved to a location on the two-dimensional view screen outside the soft boundary zone, determining a tracking speed for reorienting the virtual camera, the determining of the tracking speed based on a distance of the part of the subject from the soft boundary zone, wherein the tracking speed gets slower as the distance gets closer to the target zone and the tracking speed gets faster as the distance gets farther from the target zone, and performing the changing of the orientation of the virtual camera to bring the part of the subject back into the target zone at the tracking speed.

11. The non-transitory computer-readable medium of claim 10, the operations further including:

associating a hard boundary on the two-dimensional view screen with the target zone, the hard boundary being larger than and including the soft boundary; and based on a detection that the part of the subject has moved to a location on the two-dimensional view screen that is outside the hard boundary associated with the target zone, setting the tracking speed above a predetermined threshold, and performing the changing of the orientation to bring the part of the subject back to the edge of the hard boundary substantially immediately.

12. The non-transitory computer-readable medium of claim 10, further comprising a collider module incorporated into the one or more computer memories, the collider module configured to move the virtual camera forward in a 3D environment on a target ray associated with the virtual camera to avoid an obstacle within the 3D environment that is in contact with the target ray, the target ray extending from an origin of the virtual camera through the target zone on the two-dimensional view screen of the virtual camera to 3D coordinates within the 3D environment associated with the part of the subject, the forward movement including moving the virtual camera on the target ray to a point between the obstacle and the part of the subject.

13. The non-transitory computer-readable medium of claim 12, wherein the collider module is further configured to move the virtual camera to an original height associated with the virtual camera prior to the obstacle contacting the target ray;

wherein the moving includes iterating over a series of steps, the series of steps including:

casting a negative ray along the target ray, in a direction away from the subject, moving the virtual camera along the negative ray until the negative ray meets a horizontal plane defined by the original height or encounters an object;

based on an object being encountered, defining a new ray as a projection of the negative ray onto a plane defined by a surface normal at a point where the negative ray hits the object, moving the virtual camera along the new ray, stopping when either the horizontal plane is reached, a second object is hit or an edge of a bounding box of the object is reached;

based on the second object being hit, repeating the moving of the virtual camera;

based on the edge of the bounding box being reached, redefining the target ray as a direction from the part of the subject to a location of the camera, and repeating the moving of the virtual camera; and based on the negative ray or the new ray hitting the horizontal plane at a point, moving the camera to the point.

14. The non-transitory computer-readable medium of claim 12, further comprising a composition module and an additional collider module incorporated into to the one or more computer memories, the composition module and the additional collider module configured to perform operations for changing an orientation and position of an additional virtual camera to keep the part of the subject within a target zone associated with the additional virtual camera, the virtual camera and the additional virtual camera comprising a meta camera, the meta camera configured to select either the virtual camera or the additional virtual camera based on a score of a shot of the part of the subject captured by the virtual camera and a score of a shot of the part of the subject captured by the additional virtual camera.

15. The non-transitory computer-readable medium of claim 14, wherein the score of the shot captured by a virtual camera is determined by one or more of the following:

an amount of displacement given to the virtual camera;

an amount of difference between a distance from the part of the subject to the virtual camera and a predetermined distance value; and an amount of change of orientation given to the virtual camera.

16. The non-transitory computer-readable medium of claim 14, wherein a plurality of meta cameras are created, with each meta camera from the plurality of meta cameras associated with a different cinematographic shot type, and each virtual camera within a meta camera of the plurality of meta cameras providing a variation of the shot type associated with the meta camera.

17. The non-transitory computer-readable medium of claim 12, wherein the composition module may adjust a field of view of the virtual camera based on a distance between the part of the subject and the virtual camera in order to minimize changes in a size of the subject on the two-dimensional view screen.

18. A method comprising:

performing, using one or more computer processors, operations for changing an orientation of a virtual camera to keep a part of a subject within a target zone on a two-dimensional view screen of the virtual camera, the operations comprising:

associating a soft boundary zone on the two-dimensional view screen with the target zone, the target zone occupying a first region of the two-dimensional view screen, the soft boundary zone occupying a second region of the two-dimensional view screen, the first region lying within the second region; and based on a detection that the part of the subject has moved to a location on the two-dimensional view screen outside the soft boundary zone, determining a tracking speed for reorienting the virtual camera, the determining of the tracking speed based on a distance of the part of the subject from the soft boundary zone, wherein the tracking speed gets slower as the distance gets closer to the target zone and the tracking speed gets faster as the distance gets farther from the target zone, and performing the changing of the orientation of the virtual camera to bring the part of the subject back into the target zone at the tracking speed.

19. The method of claim 18, further comprising a collider module incorporated into the one or more computer memories, the collider module configured to move the virtual camera forward in a 3D environment on a target ray associated with the virtual camera to avoid an obstacle within the 3D environment that is in contact with the target ray, the target ray extending from an origin of the virtual camera through the target zone on the two-dimensional view screen of the virtual camera to 3D coordinates within the 3D environment associated with the part of the subject, the forward movement including moving the virtual camera on the target ray to a point between the obstacle and the part of the subject.

20. The method of claim 19, further comprising a composition module and an additional collider module incorporated into to the one or more computer memories, the composition module and the additional collider module configured to perform operations for changing an orientation and position of an additional virtual camera to keep the part of the subject within a target zone associated with the additional virtual camera, the virtual camera and the additional virtual camera comprising a meta camera, the meta camera configured to select either the virtual camera or the additional virtual camera based on a score of a shot of the part of the subject captured by the virtual camera and a score of a shot of the part of the subject captured by the additional virtual camera.

* * * * *